United States Patent [19]
Meissner et al.

[11] 3,766,702
[45] Oct. 23, 1973

[54] PACKAGING MACHINE FOR INDIVIDUAL PORTIONS, AND METHOD

[75] Inventors: Konrad E. Meissner, Lafayette; William A. Lane, Danville; Edwin J. Pelster, Pleasanton, all of Calif.

[73] Assignee: Filper Corporation, San Ramon, Calif.

[22] Filed: Dec. 15, 1971

[21] Appl. No.: 208,178

[52] U.S. Cl. .......................... 53/30, 53/141, 53/184
[51] Int. Cl. ............................................. B65b 47/02
[58] Field of Search ......................... 53/30, 184, 141; 26/54, 57 R, 57 E; 156/229; 264/288, 291; 425/348, 388, 109

[56] References Cited
UNITED STATES PATENTS

| | | | |
|---|---|---|---|
| 2,896,262 | 7/1959 | Herrmann | 264/288 |
| 2,970,414 | 2/1961 | Rohdin | 53/30 X |
| 3,186,137 | 6/1965 | Eitzen | 53/30 X |
| 3,267,639 | 8/1966 | Ollier et al. | 53/184 X |
| 3,409,494 | 11/1968 | Korzinek | 53/184 X |
| 3,600,746 | 8/1971 | Kostur et al. | 26/54 X |

Primary Examiner—Robert L. Spruill
Attorney—Mark Mohler et al.

[57] ABSTRACT

A packaging machine for individual portions in which a strip of thermoplastic film is automatically releasably gripped along it s longitudinally extending marginal portions by rows of gripping elements and while so gripped, the film is moved in a forward direction and is progressively heated by a heater and progressively tautened transversely of its movement as it softens. After leaving the heater and while still gripped, the softened film is positioned over upper mold forms at a cup-forming station at one end of the upper run of an endless row of such forms which upper run is moved in said forward direction toward a filling and sealing station successively spaced from said one end. A lower mold form at said cup-forming station is moved against the upper mold form to form the cup-mold and mechanical and suction means forms a plurality of cups in the film after which the marginal grippers and the lower mold form automatically release the film for movement to the filling station where the cups in the film are filled, and the filled cups are then moved to the sealing station while the cups are still in the upper mold forms. At the sealing station a cover sheet is positioned over the cups and is heat sealed to the upper surface of the film around the cup openings during uniform application of pressure against the upper and lower sides of the film at said surface, and finally the film and filled, sealed cups are moved out of the upper mold forms and the cups are cut from the film to provide filled and sealed individual packages.

7 Claims, 32 Drawing Figures

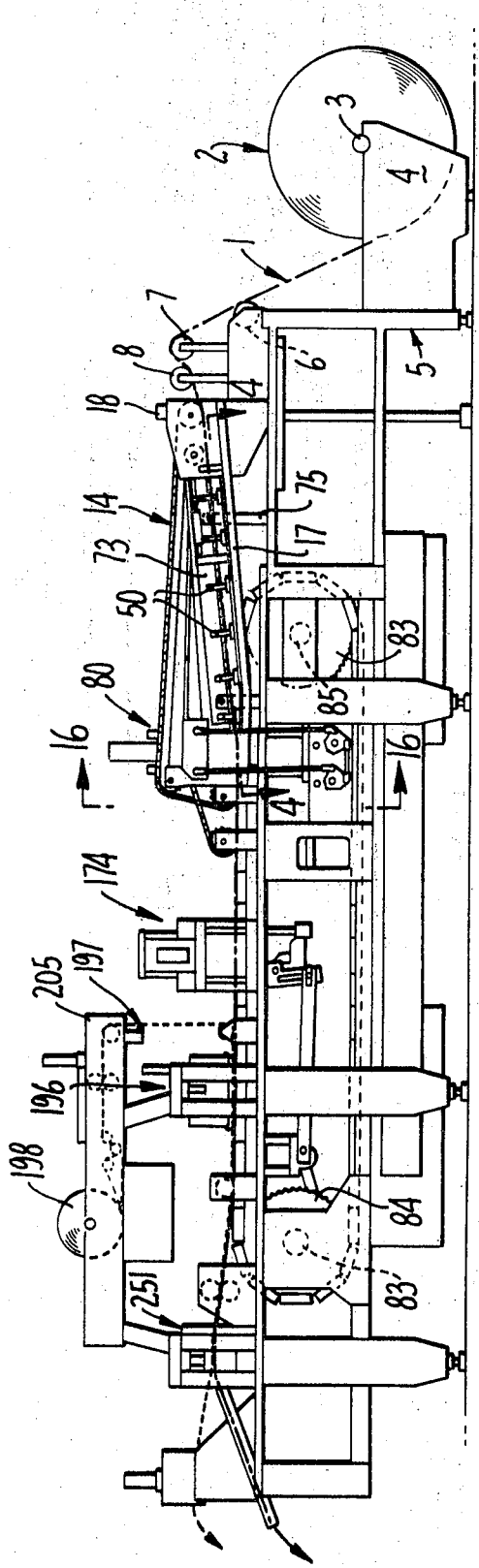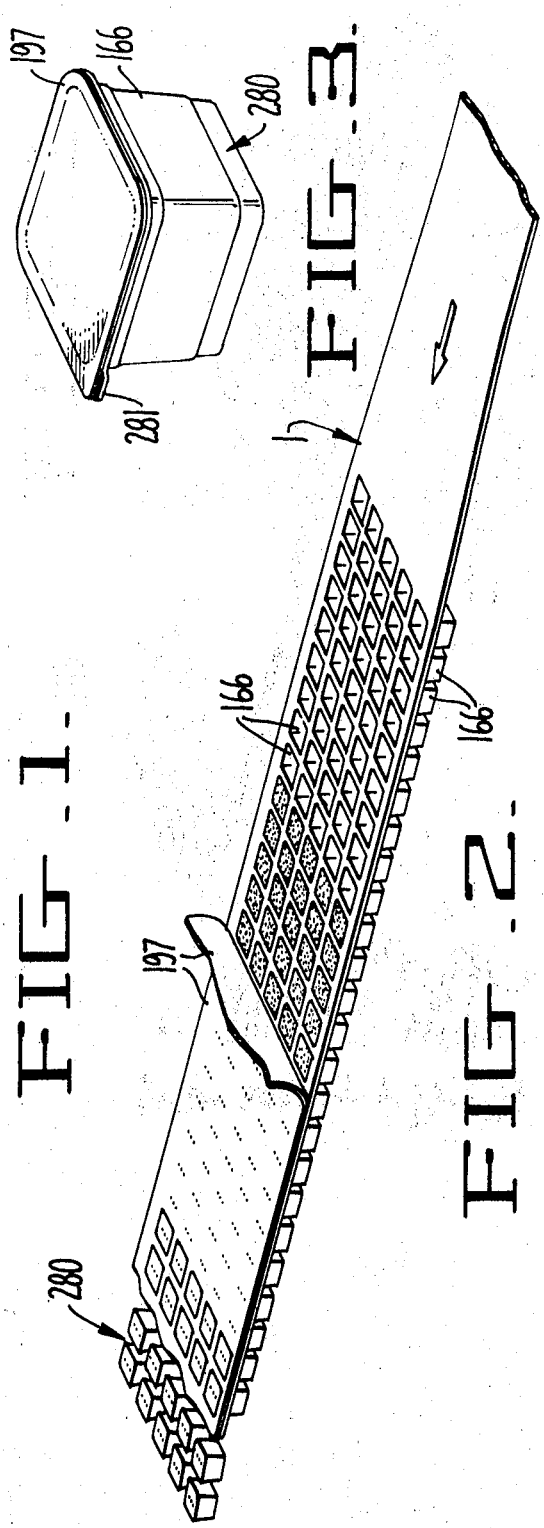

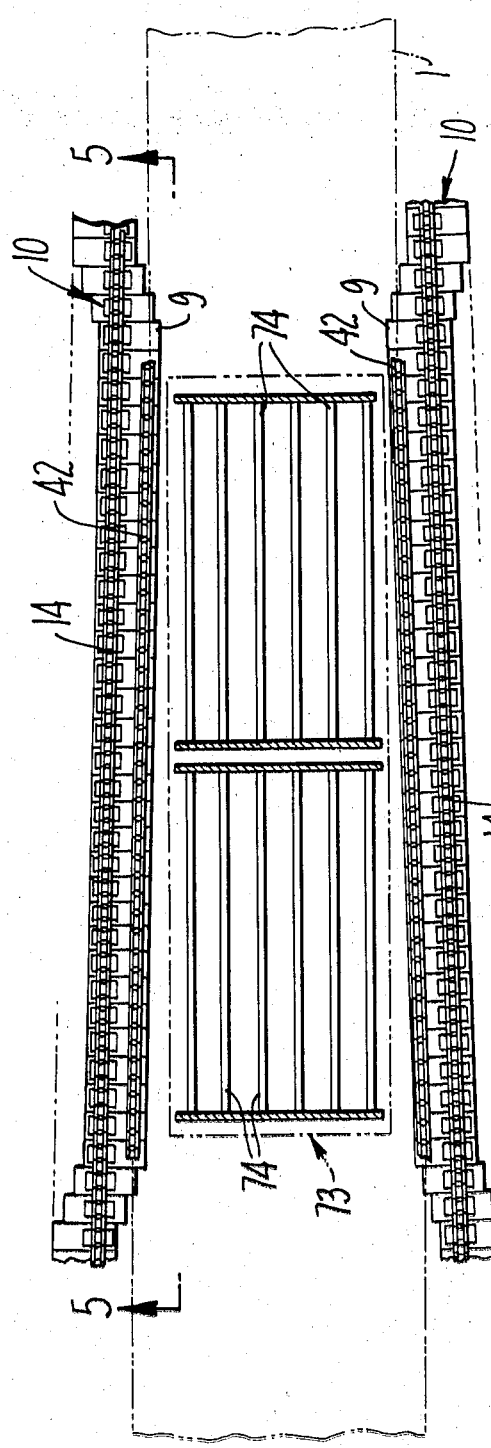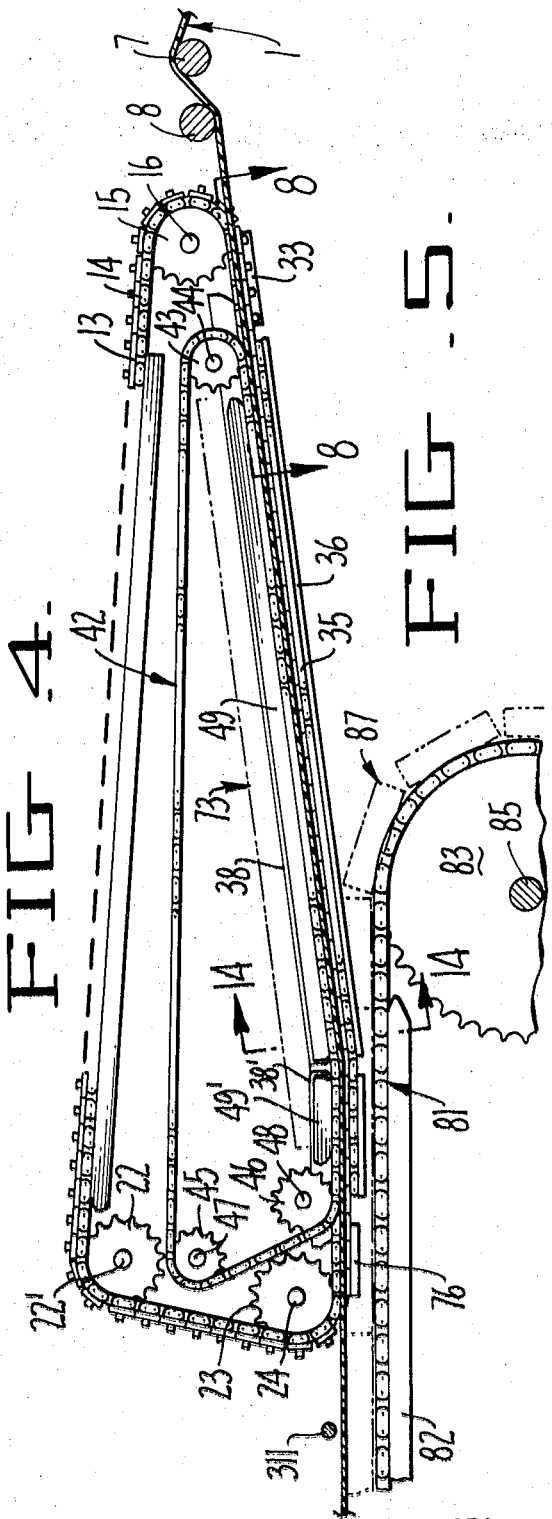

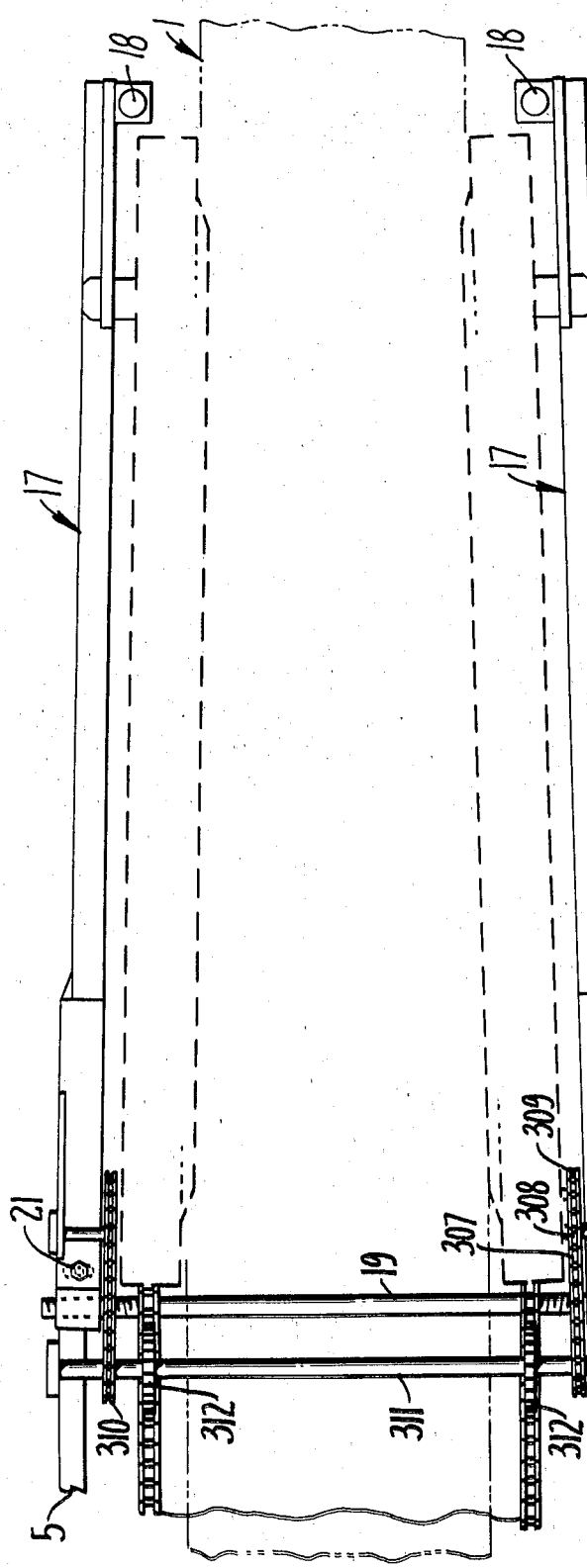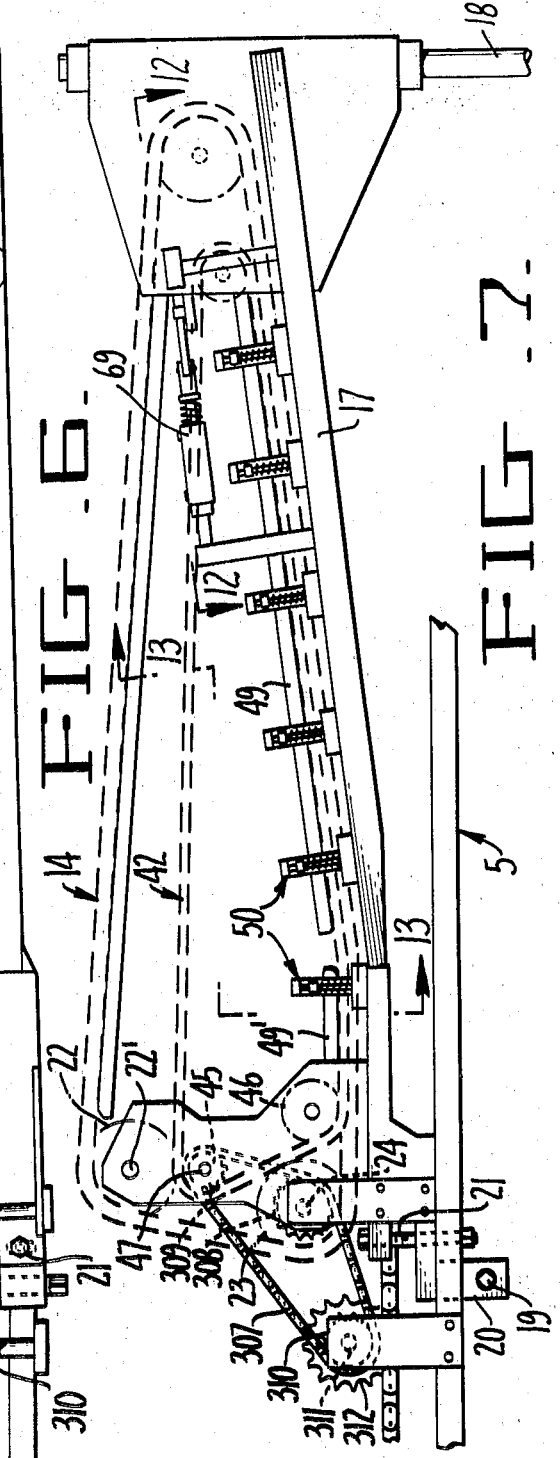

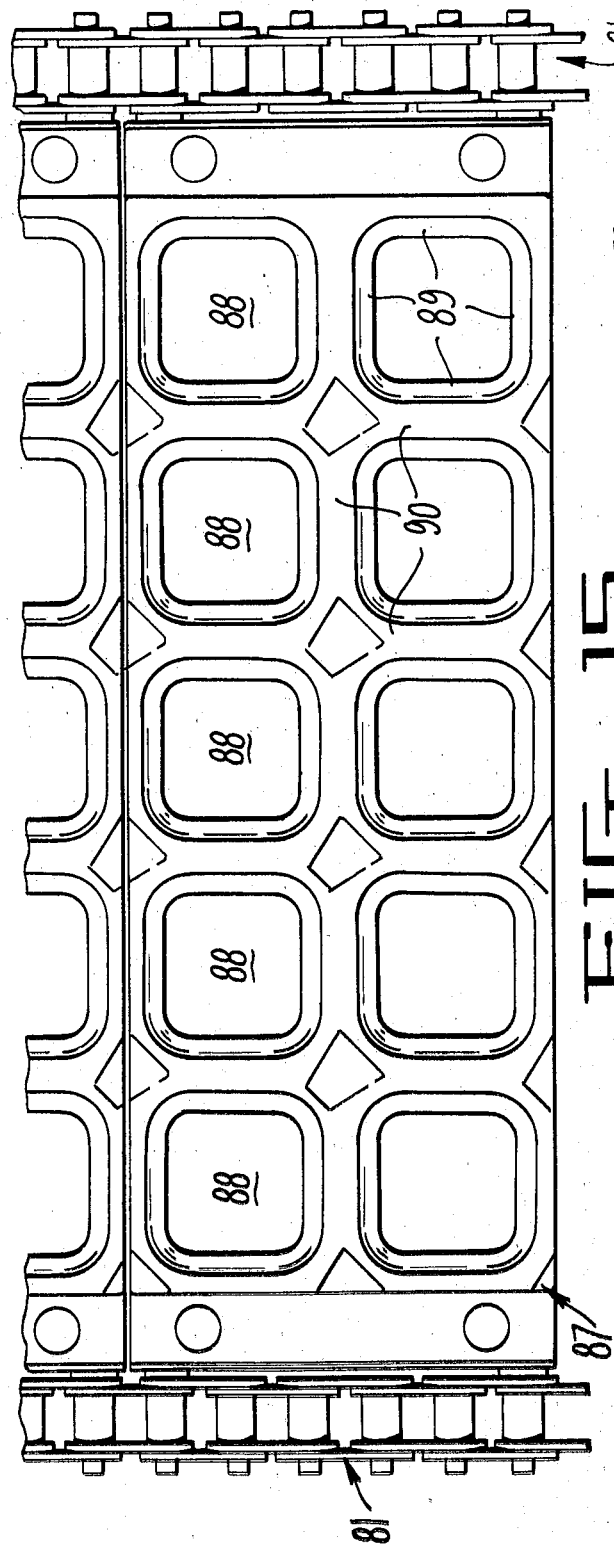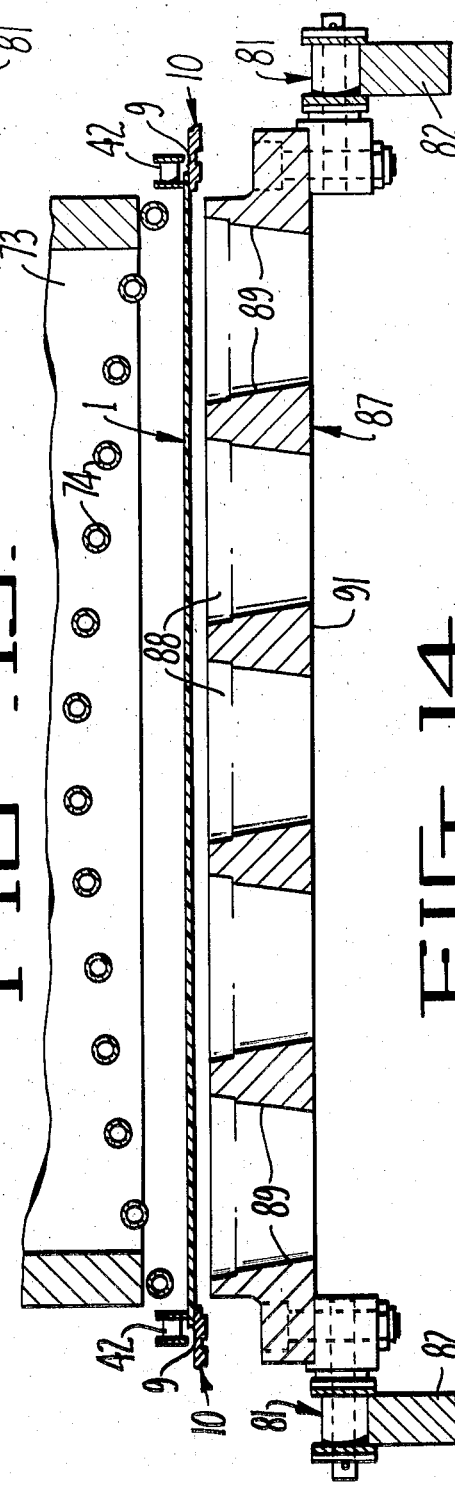

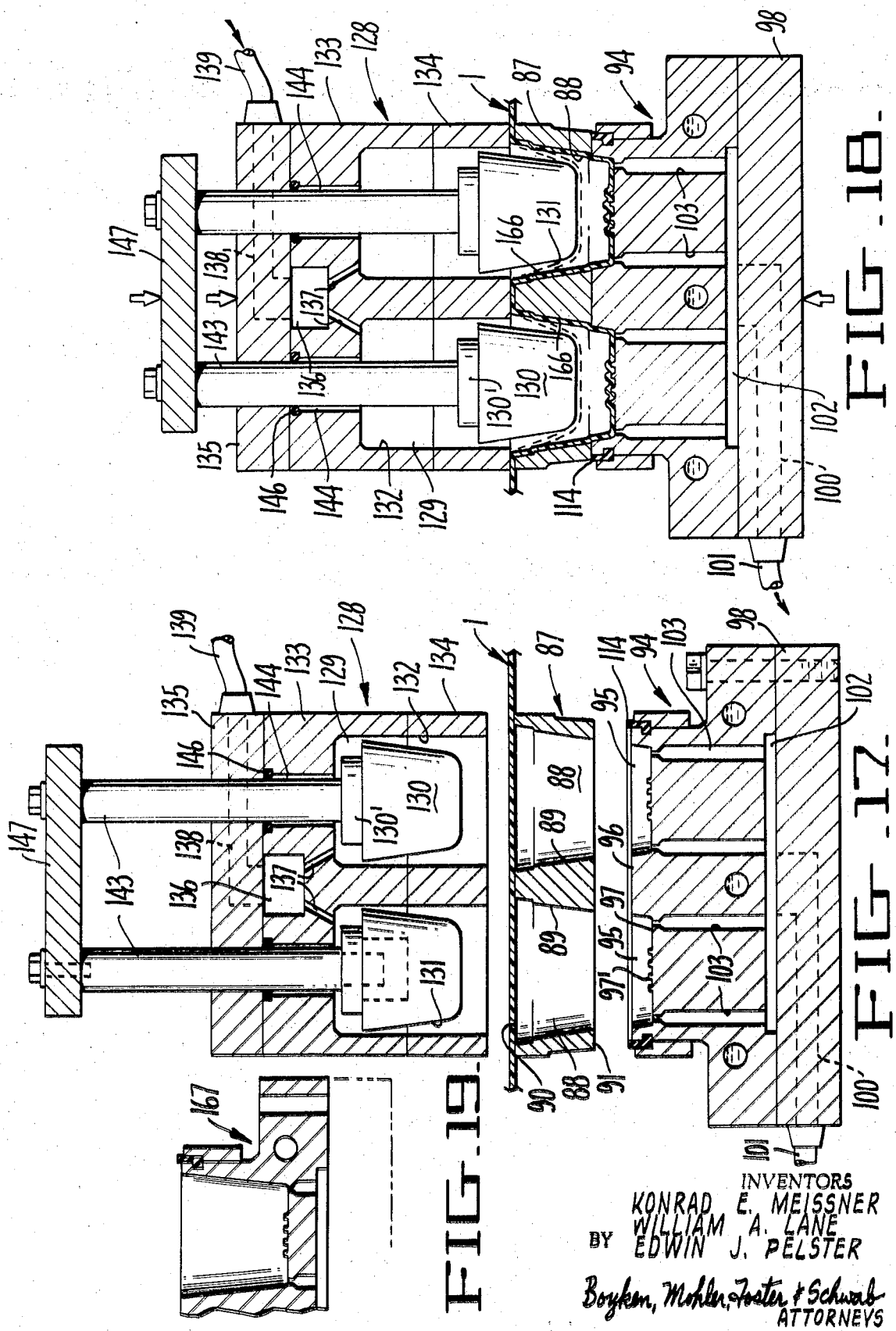

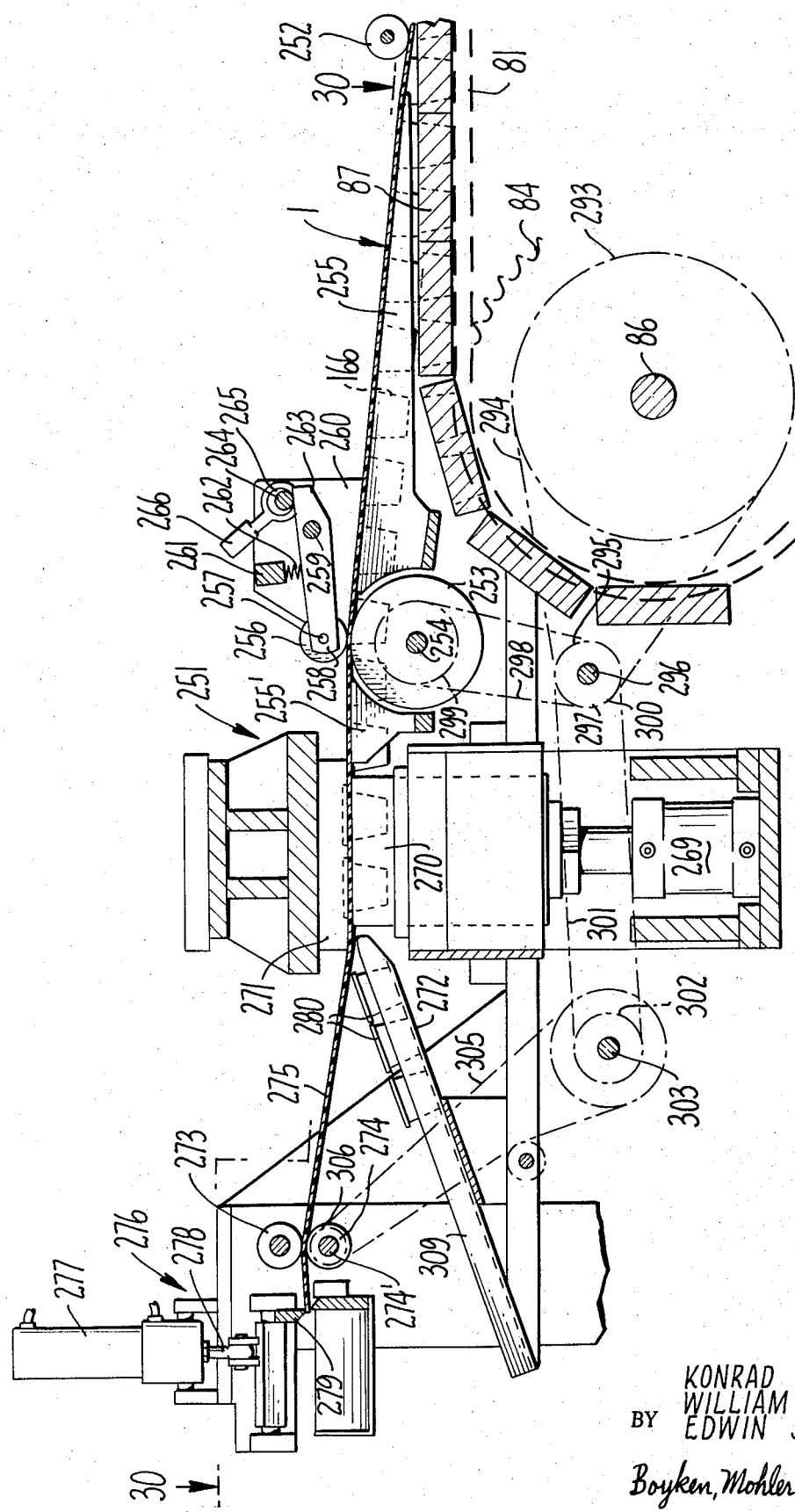

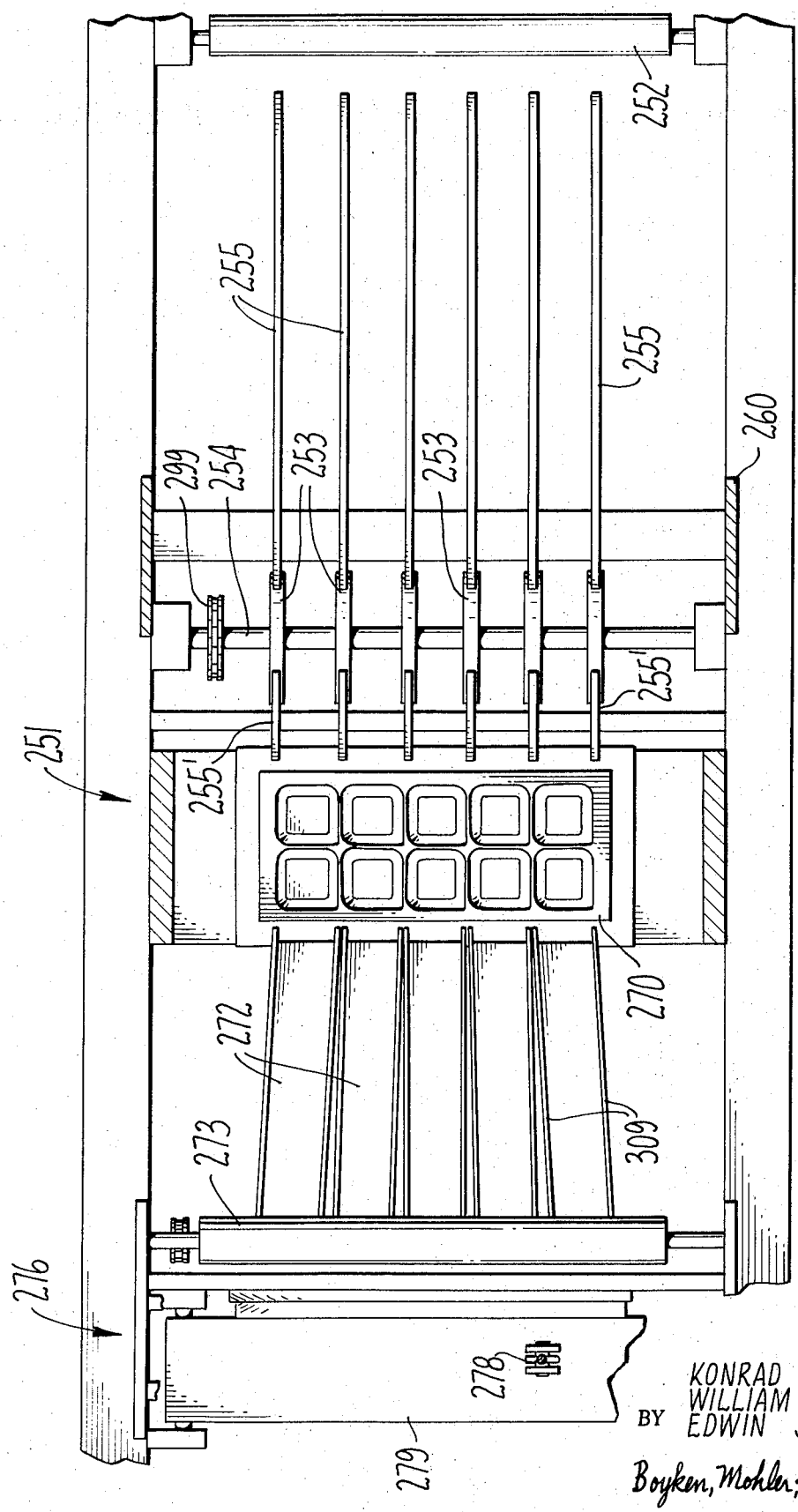

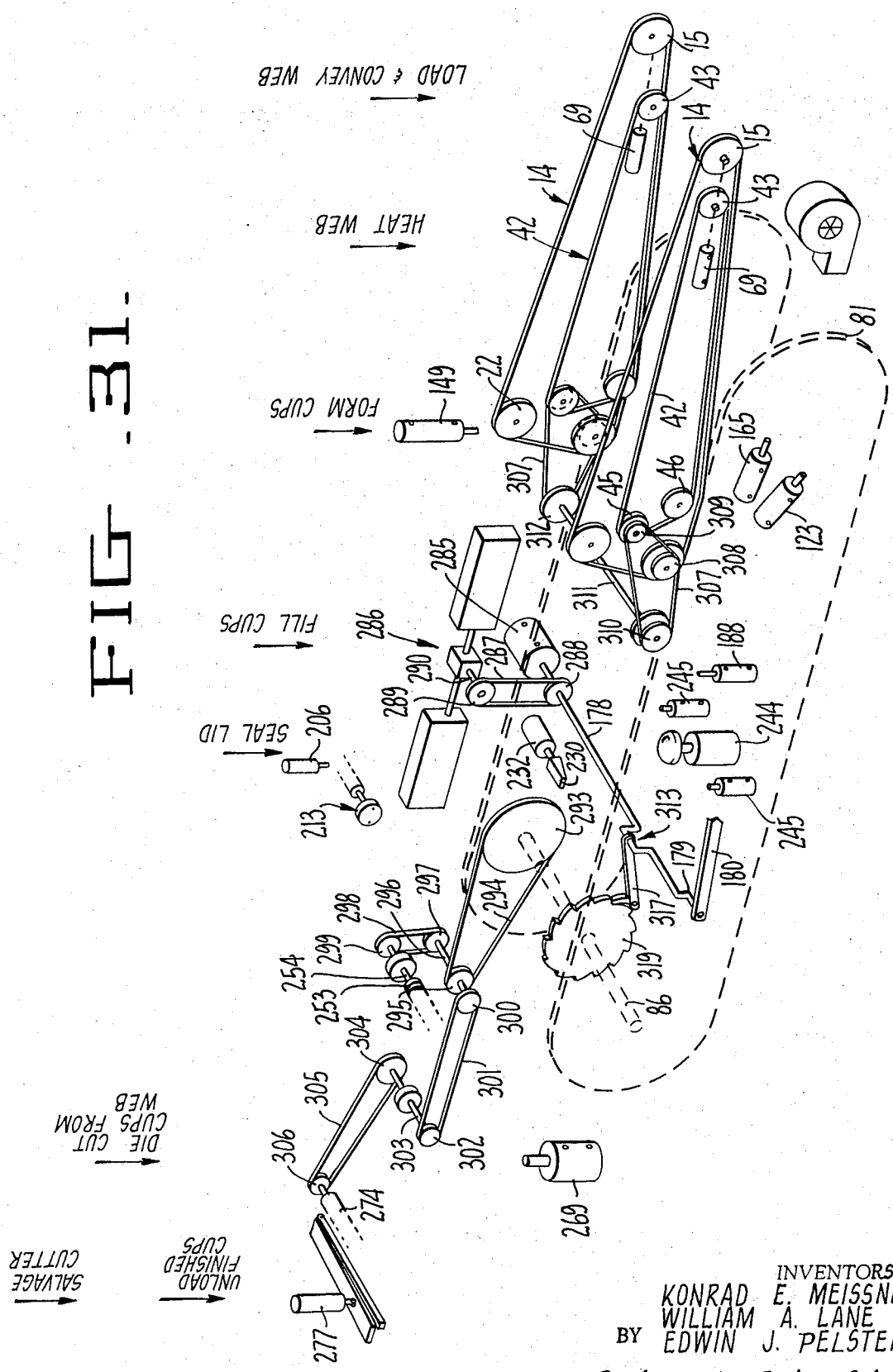

PACKAGING MACHINE FOR INDIVIDUAL PORTIONS, AND METHOD

SUMMARY

A relatively wide, thermoplastic strip is intermittently drawn past heaters to soften the strip and at the same time the strip is progressively stretched transversely of its length to take up the slack due to expansion, after which and during a stationary interval, a plurality of cup cavities are formed in the softened portion of the strip.

Following the formation of the cups, or cup cavities, the strip is moved to a filling station where the cups are filled.

After filling the cups, the strip is moved to a sealing station where a closure sheet of printed metal foil, coated on the unprinted side with a plastic adapted to adhere to the plastic cup-film, is drawn from a roll thereof and positioned over the filled cups for sealing to the latter. Individual imprints on the closure sheet are adapted to register with the open side of each cup in the cup-strip and such registration is controlled by an electric eye arrangement past which the closure sheet is moved on its way to said strip.

Following the positioning of the closure sheet over the cups in the cup-film, the sheet is sealed to coplanar marginal portions of the cups, and thereafter the cup-film and closure strip are moved to a cutting station where the cup-film, filled cup, and closure sheet are die cut to provide individual, sealed, filled cups.

The scrap material is removed to a salvage cutter.

One of the objects of the invention is the provision of a more efficient and reliable machine, and method, for packaging individual portions.

Another object of the invention is the provision of a machine and method whereby the packaging of individual portions of different sizes from a continuous strip of thermoplastic material may be more quickly and economically accomplished than heretofore.

A still further object of the invention is the provision of structure in a machine for forming cups or cavities in a continuous strip of thermoplastic material for receiving a filling material, in which the strip is heated and is stretched and held against sagging due to such heating, during formation of the cavities.

An added object of the invention is the provision of improved means for insuring uniform and complete closing and sealing of individual, filled portions in a plurality of cups in a machine for forming and filling such portions.

Other objects and advantages will appear in the description and drawings.

DESCRIPTION OF DRAWINGS

FIG. 1 is a side-elevational view of the machine.

FIG. 2 is a fragmentary isometric view of the film from which the packages are formed including the different stages thereof from forming through filling, covering and separating the individual portions.

FIG. 3 is an isometric view of one of the finished packages.

FIG. 4 is a semi-diagrammatic top plan view, partly in cross-section, of the film feeding portion of the machine adjacent the feed end thereof, separate from the supporting frame.

FIG. 5 is a cross-sectional view along line 5—5 of FIG. 4.

FIG. 6 is a fragmentary top plan view of the frame and driven elements for the film at the feed end of the machine; with the film and portions between the frame being indicated in broken lines.

FIG. 7 is a fragmentary side-elevational view of the elements shown in FIG. 6 including the yieldable hold down elements, with the carrying chains and sprockets shown in broken lines.

FIG. 14 is an enlarged fragmentary cross-sectional view along line 14—14 of FIG. 5, showing the film over the cup mold.

FIG. 15 is a fragmentary top plan view of a portion of the cup mold.

FIG. 17 is an enlarged fragmentary cross-sectional view through the die and mold assembly in separated position at line 17—17 of FIG. 16, for forming a deep cup, and FIG. 18 is a view taken along the same line with the die in a position within the mold.

FIG. 19 is an enlarged cross-sectional view through a portion of a mold form adapted to be substituted for the one shown in FIGS. 17, 18 for forming a larger size cup.

FIG. 27A is a view along line 27A—27A of FIG. 27.

FIG. 29 is an enlarged cross-sectional view through the cutting assembly.

FIG. 30 is a cross-sectional view along line 30—30 of FIG. 29.

FIG. 31 is a semi-diagrammatic view of the driving train for driving the film and programmer.

DESCRIPTION OF MACHINE CUP FILM CARRYING ASSEMBLY AND HEATER

Figure 8:
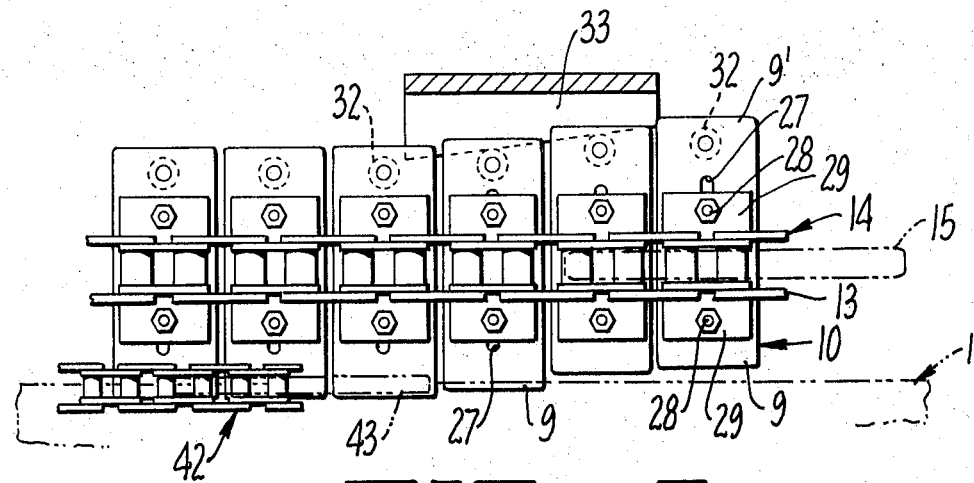
FIG. 8 is an enlarged, fragmentary, top plan view of a portion of the film carrying chain assembly as seen from line 8—8 of FIG. 5, with several parts indicated in broken lines.
Figure 9:
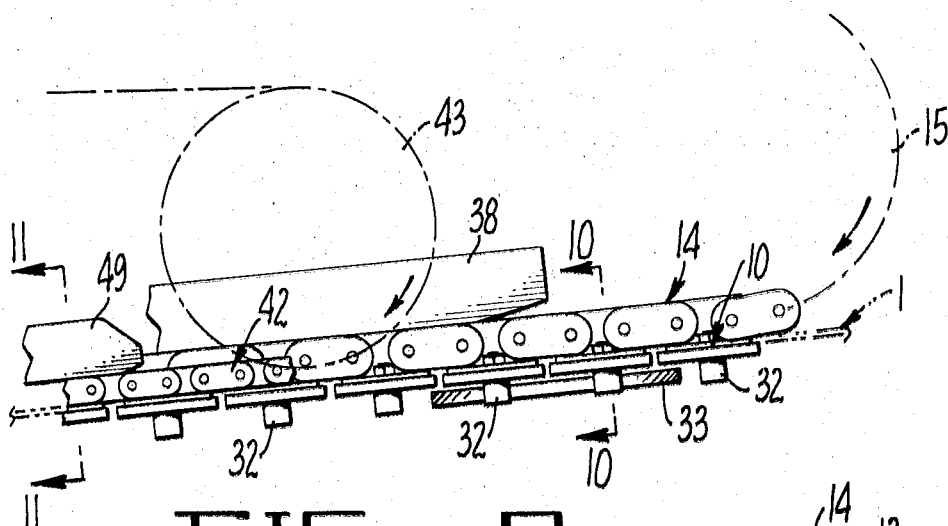
FIG. 9 is a fragmentary side-elevational view of the portion shown in FIG. 8.

Referring to FIG. 1, the cup stock comprises a relatively wide strip 1 of thermoplastic material, such as a high impact polystyrene, drawn from a roll 2 at the feed end of the machine, which is the right hand end as viewed in FIG. 1. Roll 2 is on a horizontal shaft 3 that, in turn, is rotatably supported at its ends on stationary supports 4, which supports are rigid with the main frame of the machine, generally designated 5.

Strip 1 is drawn upwardly from roll 2, successively passing over rollers 6, 7 and then in a generally horizontally extending direction under a roller 8. Said rollers are parallel with each other and are rotatably supported at their ends on main frame 5.

After passing under roller 8, strip 1 extends generally horizontally or forwardly away from the feed or rear end of the machine to a position in which its opposite longitudinally extending marginal portions are over and supported on the inner end portions 9 of horizontally disposed slides that are generally designated 10 (FIGS. 4, 8–11).

The slides 10 are secured on links 13 of a pair of corresponding, endless chains 14, which chains extend at the feed end of the machine over a pair of sprocket wheels 15 (FIG. 5) which are rotatably supported independently of each other on separate stub shafts 16.

Auxiliary side frames generally designated 17 (FIGS. 6, 7) extend longitudinally of the machine and strip 1 along opposite edges of said strip 1, and each frame is supported at the feed or rear end of the machine on a one of its ends at vertical post 18 for swinging the opposite ends of the frames 17 horizontally toward and away from each other. Said opposite ends of frames 17 may be called the forward ends to distinguish from the rear or feed ends. The words "forward," "forwardly" will be used with reference to the direction of movement of the cup-film 1 through the machine, which is forwardly.

An adjusting screw 19 extends between the forward ends of the frames 17, which screw is oppositely threaded at its ends in blocks 20 that are pivotally supported on said frames for adjustably spacing the forward ends of the frames from each other upon rotation of the screw in one direction. Locking bolts 21 lock the forward ends of frames 17 in adjusted positions on main frame 5.

Figure 12:
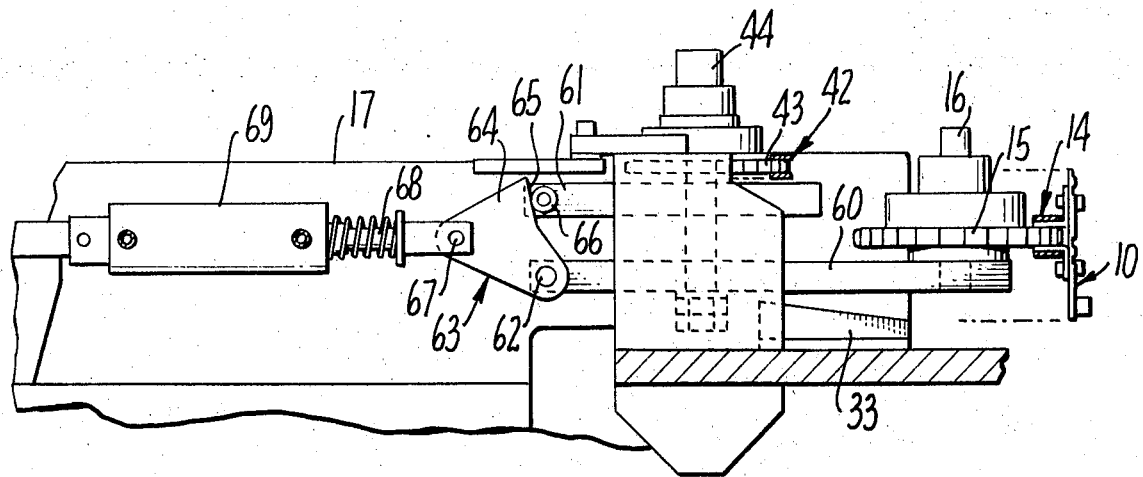
FIG. 12 is an enlarged fragmentary plan view, partly in cross section, of a portion of the machine as seen from line 12—12 of FIG. 7 showing the chain tightener.

The stub shafts 16 carrying sprocket wheels 15 are supported in bearings that, in turn, are on plates 60, which plates are reciprocably supported on the side frames 17 for movement longitudinally thereof for tightening the chains, as will later be more fully described. (FIG. 12)

The upper and lower runs of each chain 14 extend divergently forwardly from sprockets 15 (FIGS. 1, 4) in vertical planes, the upper runs extending over upper sprocket wheels 22 at the forward end of each frame 17, each of which is on a stub shaft 22' rotatably in a bearing supported on the auxiliary side frame 17 adjacent thereto, while the lower runs of the chains 14 extend over lower sprocket wheels 23 spaced below wheels 22 respectively secured on stub shafts 24, each on one of the side frames 17.

The frames 17 are normally adjusted so that they extend divergently relative to each other from their feed ends toward their discharge ends, hence chains 14 and the slides 10 carried thereby will also extend divergently relative to each other horizontally along their upper and lower runs from the sprockets 15 to the upper and lower sprockets 22, 23.

The lower runs of chains 14 extend slantingly downwardly from sprockets 15, and move downwardly and forwardly away from sprockets 15 when the machine is operated.

Slides 10 are supported on the outer sides of the chains 14 relative to the pairs of sprocket wheels over which the chains extend, hence the slides on the lower runs of the chains are below said runs (FIGS. 8–11).

The slides 10 are elongated in a direction transversely of chains 14 and are slotted at 27 (FIGS. 10, 11) for shoulder bolts 28 which, in turn, are secured on brackets 29 secured to the links 13. The heads of the bolts secure the slides to the brackets. Each of the slides is movable longitudinally thereof inwardly to the positions 31 indicated in broken lines in FIG. 10, in which positions the marginal portions of the strip 1 will be supported.

Figure 10:
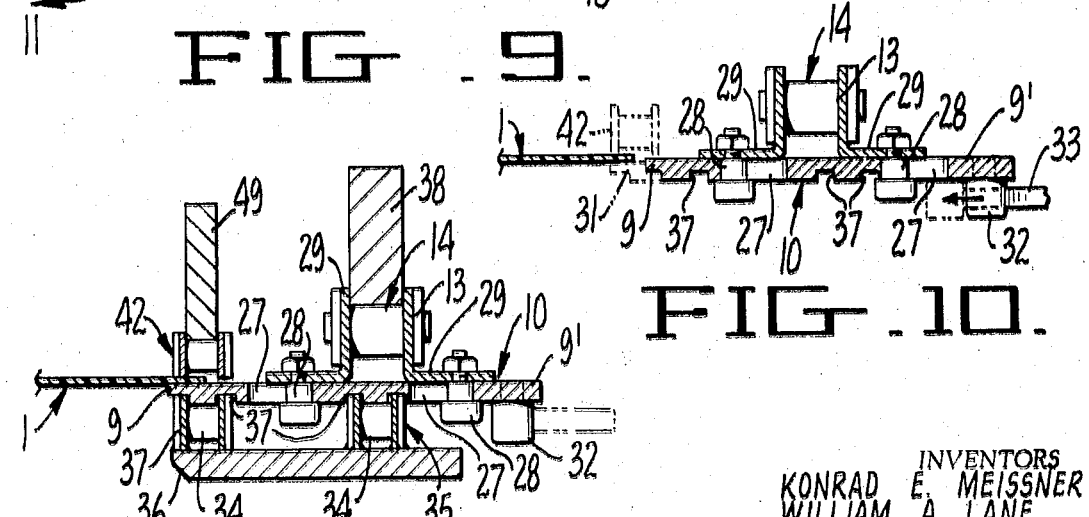
FIG. 10 is an enlarged, fragmentary cross-sectional view along line 10—10 of FIG. 9 showing the film engaging portion in retracted position.
Figure 11:
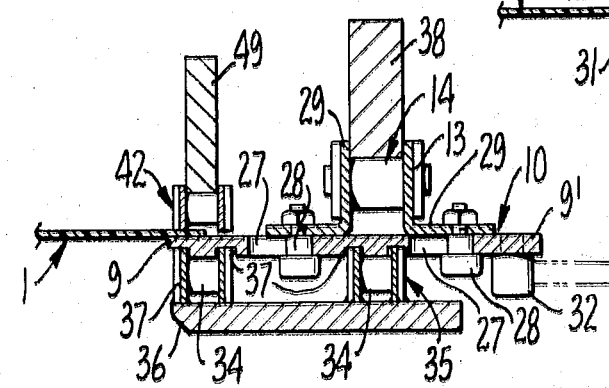
FIG. 11 is a view similar to FIG. 10 showing the film engaging portion in film-engaging position.

The full line position of one of the slides 10 shown in FIG. 10 is the retracted position while it is below the margin of strip 1 in FIG. 11.

The end portions 9' of slides 10 are the end portions opposite to portions 9, or the outer end portions, and each of said slides has a depending pin 32. The slides are in retracted positions as they move from the lower sprockets 23 upwardly over upper sprockets 22 and over sprockets 15, and before the slides reach the strip 1, a stationary cam 33 on each side frame 17 (FIG. 9) is engaged by pins 32 which move the slides to positions 31 in which the marginal portions of the strips are over said portions 9 as the lower runs of the chains move forwardly.

After the slides are moved to positions 31 at the upper ends of the lower runs of chains 14 they are supported and guided on rollers 34 (FIG. 11) on stationary lengths of chains 35 that, in turn, are rigid on stationary supports 36 carried by frames 17. Said slides 10 are grooved at 37 (FIG. 10) to receive the side plates of the links of chains 35 and to thus hold the slides against shifting longitudinally thereof while the marginal portions of the strip 1 are thereon.

Hold-down rails 38 (FIGS. 9, 11) supported on the side frames 17 are positioned over the lower runs of chains 14 and engage the rollers of said chains between the side plates of its respective links 13 to also guide the strips 10 and to hold them in their positions on the rollers 34 of the stationary chain lengths 35.

Positioned between the pair of endless chains 14 is another pair of endless chains 42 that correspond to each other, each chain 42 extending over sprocket wheels 43 at the rear end of the frames 17 (FIG. 5).

Each chain 42 is adjacent to one of the side frames 17 and the sprocket wheels 43 are on stub shafts 44 carried by each frame 17.

Upper and lower sprocket wheels 45, 46 respectively on stub shafts 47, 49 are on frames 17 adjacent the forward ends of said frames and the ends of endless chains 42 at the forward ends of frames 17 extend over said sprocket wheels 45, 46.

The lower runs of chains 42 are positioned to engage the upper surfaces of the longitudinally extending marginal portions of strip 1 when said strips 10 are in positions below said marginal portions.

A hold-down rail 49 is positioned over the lower run of each of the chains 42 in yieldable engagement with the rollers of said chains for yieldably urging said lower runs downwardly to grip the marginal portions of the strip 1 against the end portions 9 of the slides 10.

Rail supporting devices generally designated 50 (FIGS. 1, 7) are supported in rows respectively adjacent to and outwardly of the marginal portions of strip 1 when the latter are on portions 9 of slides 10.

Figure 13:
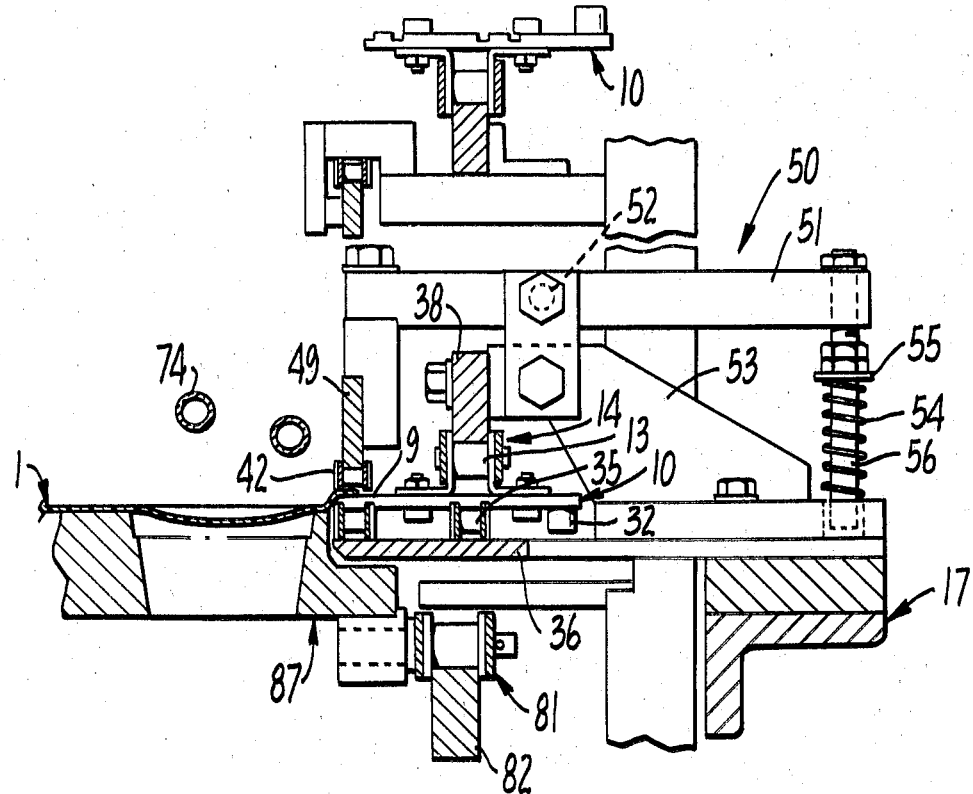
FIG. 13 is an enlarged cross-sectional view of a part of the film engaging portion approximately as seen from line 13—13 of FIG. 7.

Each of said rail supporting devices 50 comprises a rocker arm 51 (FIG. 13). Rail 49 is secured on one of the corresponding ends of said rocker arms and a pivot 52 pivotally supports each arm 51 intermediate its ends on a bracket 53 rigid on the adjacent frame 17. The same brackets support rails 38.

The ends of arms 51 opposite rail 49 are each yieldably urged upwardly by a coil spring 54 that reacts between the stationary base of each bracket 53 and a washer 55 held on a vertically reciprocable pin 56 that is secured on the end of each arm 51 opposite to rail 49.

Referring to FIG. 12, the stub shafts 16 for the upper rear sprockets of chains 14 are each supported in a bearing on a plate 60 that is reciprocably supported on the adjacent auxiliary side frame 17 for movement longitudinally of the frame while the stub shafts 44 for the rear sprockets 45 of chains 42 are each similarly carried by plates 61 that are also reciprocably supported on the adjacent side frame 17 for movement longitudinally of the frame.

Plates 60, 61 extend forwardly from shafts 16, 44 and the forward end of each plate 60 is pivotally connected by pivot 62 with a link 63 having portion 64 laterally offset relative to pivot 62 that is formed with a rearwardly facing surface 65 in engagement with a roller 66 carried by the rear end of plate 61.

A forwardly extending portion of link 63 is pivotally connected at 67 to the projecting rear end of a plunger rod 68 extending into air cylinder 69 that is secured to the side frame 17 adjacent thereto. Upon air under pressure being admitted into the forward ends of cylinders 69, the link 63 will urge plates 60, 61 rearwardly to tighten the chains 14, 42.

A canopy-type oven generally designated 73 is supported on the main frame and extends longitudinally of the strip 1 (FIGS. 1, 4, 14) and is spaced over the portion of said strip that extends between the lower runs of chains 42 and from approximately the pair of sprockets 43 to sprockets 46 over which said chains extend.

This oven preferably supports below its top two sets of electrical heating lamps 74 (FIG. 14) with the lamps in each set in a transverse row extending longitudinally of the oven in parallel, spaced, side-by-side relation. The oven is positioned with its open lower side facing the portion of strip 1 that extends between said lower runs of chains 42, and substantially parallel with said strip, although it is adjustably supported at its end portions on posts 75 (FIG. 1) to enable adjusting its position.

One set of the lamps 74 extend from the upper or rear end of the oven to a point approximately midway between its ends while the other set extends from said point to the lower or forward end. Conventional controls for such lamps are in the circuit connected therewith for controlling them (FIG. 4).

The rows of lamps in each set are progressively positioned closer to the strip 1 as they approach the longitudinally extending marginal positions of said strip (FIG. 14).

As seen in FIG. 5 the lower end portions 38' of the hold-down rails 38 extend horizontally, and horizontal extensions 49' (FIG. 7) of rails 49 alongside portions 38' also extend horizontally, the extensions 49' being separate from rails 38 as they are yieldably held downwardly by hold-down devices 50.

A pair of stationary cams 76 (FIG. 5) corresponding to cams 33 of FIG. 8, except that the follower engaging edge engages the inner sides of the pins 32 on slides 10, function to move the slides back to the full line positions shown in FIG. 10 after the lower runs of chains 42 move away from clamping engagement with the strip 1 and before the lower runs of chains 14 move upwardly around the forward sprockets 23, thereby enabling strip 1 to move horizontally past slides 10 on the upwardly extending runs of chains 14, and forwardly, to the cup-forming station.

During the foregoing stage in the package forming operation, it is seen that the film strip 1 is gripped along its longitudinally extending marginal portions and the part between said portions is progressively heated during forward movement of the strip to the cup-forming station. As the strip is heated, it is softened, and consequently expands, but is progressively stretched transversely to take up the slack, so that it will be properly supported on the mold forms at the cup-forming station.

CUP-FORMING MOLD STRUCTURE

The cup-forming station is generally designated 80 (FIG. 1). The cup-forming mold structure is supported on the main frame 5 adjacent the forward ends of the auxiliary frames 17.

Figure 22:
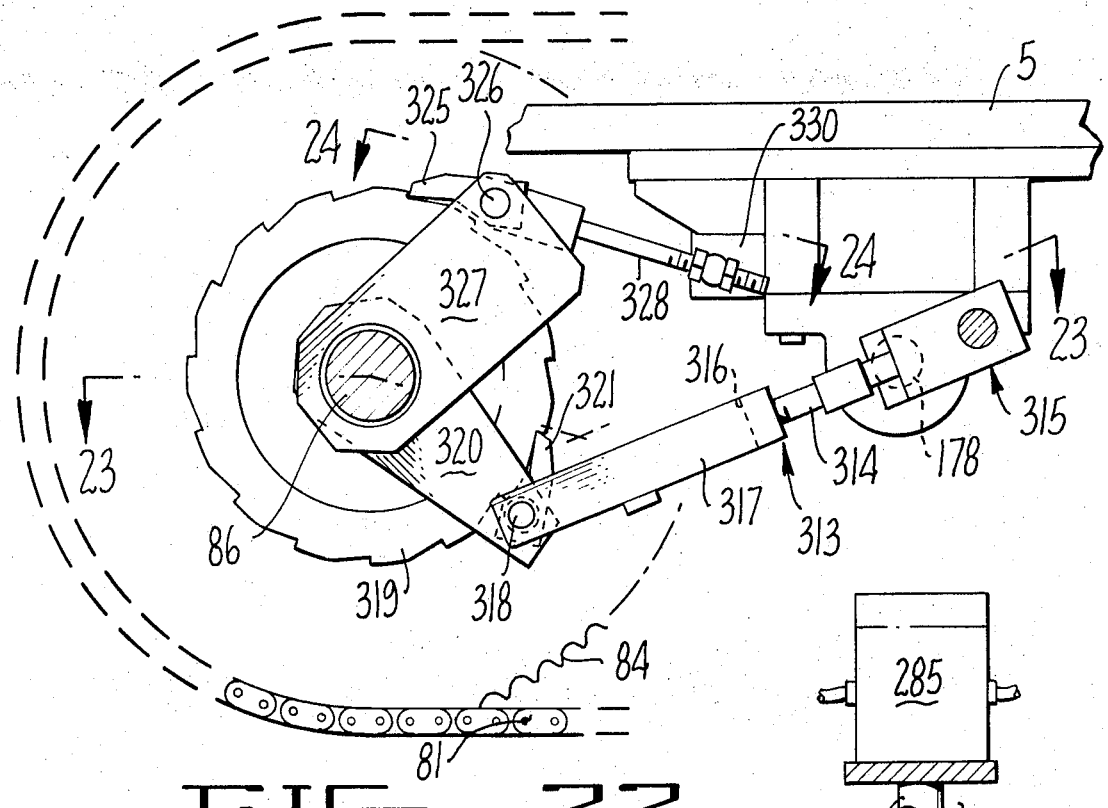
FIG. 22 is a fragmentary, enlarged, cross-sectional view of the index drive assembly.

A pair of horizontally extending endless chains 81 (FIGS. 14, 15) carry the molds. The upper runs of chains 81 are supported on horizontally extending rails 82, which rails extend longitudinally of the strip 1, and said chains extend over a pair of rear sprockets 83 at their rear ends, and over a pair of forward sprockets 84 at their forward ends. Sprockets 83 are on a shaft 85 that is supported at its ends in bearings on the main frame 5, while sprockets 84 are on shaft 86 that is also supported on the main frame (FIGS. 1, 22).

Extending between the pair of chains 81 are mold forms generally designated 87 (FIGS. 14, 15), which forms are pivotally supported at their ends on links of chains 81 for movement around the rear and forward sprockets 83, 84.

Each mold form is an elongated casting extending longitudinally thereof between the runs of chains 81, and each is formed with a pair of parallel rows of openings 88. Said rows are in side-by-side spaced relation extending lengthwise of each form, and transversely of the film strip 1. The lateral side surfaces 89 of each opening are inwardly tapered downwardly from the outer horizontal upper planar surface 90 that faces outwardly of the endless row of mold forms. The upper surfaces 90 of mold forms 87 in the row of forms that extend between the upper runs of chains 81 extend approximately in horizontal continuation of the horizontal upper film-supporting surfaces of slides 10 along the forward horizontal portions 38' of rails 38 (FIG. 5).

Inasmuch as the mold forms along the upper runs of chains 81 are the ones that are in engagement with the cup-film or strip 1, and as the mold form 87 is the uppermost part of the mold itself, it will hereafter be called the "upper" mold form to distinguish it from a lower mold form below it at the cup-forming station.

As described, the upper mold forms 87 are connected with the upper runs of chains 81.

A lower mold form, generally designated 94 (FIGS. 17, 18), comprises a horizontally disposed, elongated casting below the upper mold form 87, which lower form is formed with two rows of upwardly opening recesses 95 in its upper, horizontal, planar surface 96. These recesses are in vertical alignment with the openings 88 in the upper mold form 87 at the cup-forming station, and the lower mold form retained at the cup-forming station. The cup-film 1 is intermittently moved forwardly so that the upper mold forms will be successively positioned over the lower mold form.

The horizontal outlines of the lower ends of openings 88 are parallel with the outlines of the upper edges of recesses 95, but define larger areas, and the sides of each recess 95 are inwardly tapered in a downward direction to the horizontally disposed bottom 97 (FIG. 17). The upper side of the bottom 97 may be formed with a symbol, numbers or other indicia 97' in relief or recessed to form corresponding indicia in the bottom of each cup to be formed in the cup film 1.

A base plate 98 is secured against the lower planar surface of the lower mold form (FIGS. 17, 18), which base plate is formed with an air duct 100 connected with an air line 101. The lower planar surface of the lower mold form is formed with a recess 102 that extends below each of the cup-recesses 95 and air passageways 103 communicate between the cup-recesses and recess 102 opening into the cup recesses through the bottoms of the latter.

Base plate 98 is secured at its ends to blocks 106 (FIGS. 16, 20) that, in turn, are each slidably supported on a horizontal bar 107 (FIG. 20) secured at its ends in cross members 108 that extend transversely of the length of the lower mold form. Blocks 106 extend longitudinally of the direction of travel of the upper runs of chains 81, and springs 109 between the ends of each block 106 and the cross members 108 yieldably hold the lower mold form 94 in a position in which the recesses 95 are substantially in vertical alignment with openings 88.

A plate 110 is secured to each end of mold form 94, and each plate has positioning fingers 111 projecting upwardly therefrom. Said fingers 111 are adapted to extend between pairs of rollers on chains 81 (FIG. 20) upon upward movement of the lower mold form to insure positive vertical alignment of openings 88 with recesses 95 when the lower planar surface 91 on the upper mold form 87 at the cup-forming station is in tight engagement with the upper planar surface 96 of the lower mold form 94.

Cross members 108 are connected at their ends by end members 112. Each end member is formed with a pair of vertical bores through which a pair of vertical, stationary posts 113 extend for vertical sliding of members 108 on said posts.

From the foregoing, it is seen that the lower mold form is supported on posts 113 for vertical, reciprocable movements toward and away from the upper mold form, with the cup film 1 positioned over the openings in the upper mold form, and with the longitudinally extending marginal portions of the film still gripped between the chains 42 and the slides 10.

A yieldable seal 114 (FIG. 17) secured to the lower mold form and projecting upwardly therefrom will form a seal between the upper and lower mold forms when the lower mold form is moved upwardly to engage the upper mold form.

A pair of vertical connecting rods 117 (FIGS. 16, 20) is pivotally connected at the upper ends of the rods with each cross member 112 at each end of the latter, and the lower ends of said rods are each pivotally connected to one of separate cranks 118, which cranks are secured on a pair of shafts 119. Shafts 119 are rotatable in bearings on portions of stationary frame 5, and each rod 117 is adjustable for length.

Cranks 118 are connected for corresponding, simultaneous rotating about the axes of shafts 119 by an adjustable rod 120. An arm 121 secured at one end on one shaft 119, and projecting therefrom, is pivotally connected at its opposite end with the projecting plunger 122 from an hydraulic cylinder 123. Said cylinder is pivotally supported on a stationary part of frame 5.

Upon actuation of the hydraulic cylinder, as will later be explained, the lower mold form 94 will be moved upwardly from lowered position spaced below the upper mold form 87 (FIG. 17) to a position tightly against the upper mold form 87 (FIG. 18).

An adjustable stop 124 (FIG. 16) on end members 112 that are rigid with the lower mold form 94 will engage a stationary element 125 to limit the upper movement of the lower mold form.

Figure 16:
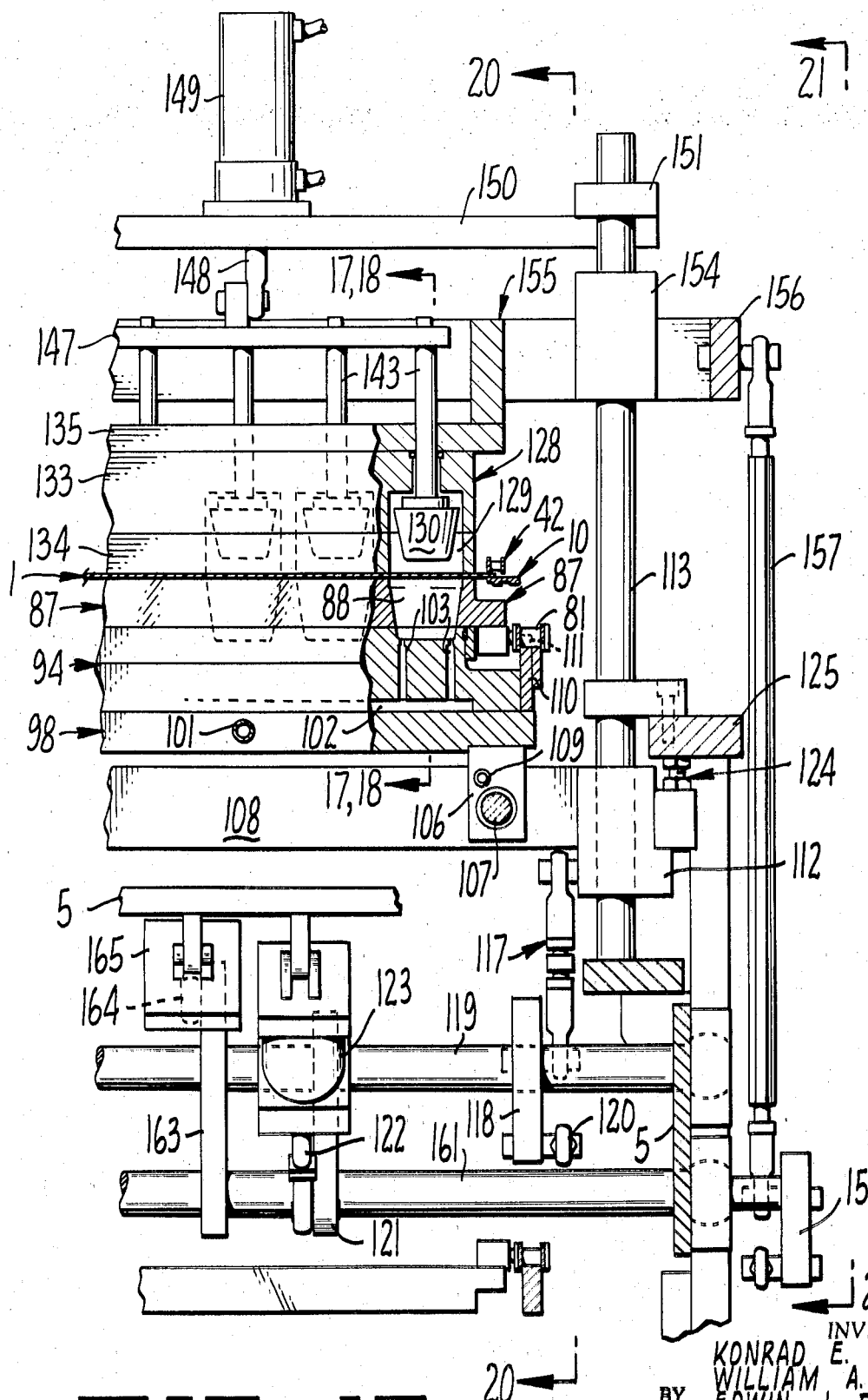
FIG. 16 is an enlarged fragmentary cross-sectional view partly in elevation, along substantially line 16—16 of FIG. 1.

Above the film strip 1 and the upper mold form 87 at the cup-forming station is a vertically reciprocable member generally designated 128 (FIGS. 16-18).

Member 128 is horizontally elongated and extends transversely across the length of the cup film 1. A plurality of downwardly opening recesses 129 are formed in said member 128, the outline of the lower end of each approximately conforming to the outline of the upper ends of openings 88 in each upper mold form 87.

Within each recess 129 is a vertically reciprocable body 130 having convergently downwardly inclined lateral surfaces 131 of approximately the same degree of inclination as the lateral surfaces 89 of each opening 88 in an upper mold form 87. Each body 130 is spaced from sides 132 of the recess 129 to provide for passage of air in the recess past the body.

The member generally designated 128 has been considered as one casting inasmuch as it operates as a rigid unit. Structurally, the recesses 129 are formed in a central main body 133 (FIGS. 17, 18) and a lower portion 134 removably secured thereto by suitable machine screws (not shown) extending downwardly through the central body 133 and into the lower portion 134, and a top plate 135 is also removably secured over the upper end of the central body 133 by machine screws (not shown) extending downwardly therethrough into the central body 133.

The central body 133 is centrally formed with an upwardly opening recess 136 (FIG. 17) extending longitudinally of the body 133 providing a manifold from which air ducts 137 lead to the upper ends of recesses 129. The upper plate 135 is formed with a passageway 138 connected at one end with a line 139 leading to a source of air under pressure, and the opposite end opening into the recess or manifold 136.

A vertical cylindrical rod 143 is centrally secured in a boss 130' projecting upwardly from each of the bodies 130. Said bodies may each be called a plug-assist, inasmuch as each is formed like a plug and will assist in forming the cups in the cup film 1.

Each rod 143 extends upwardly through vertically aligned bores 144 (FIGS. 17, 18) respectively formed in the upper end of the central body 133 and in plate 135, and ring seals 146 around the upper ends of the bores 144 in the upper end of the central body 133 provide seals against leakage of air therepast.

Figure 20:
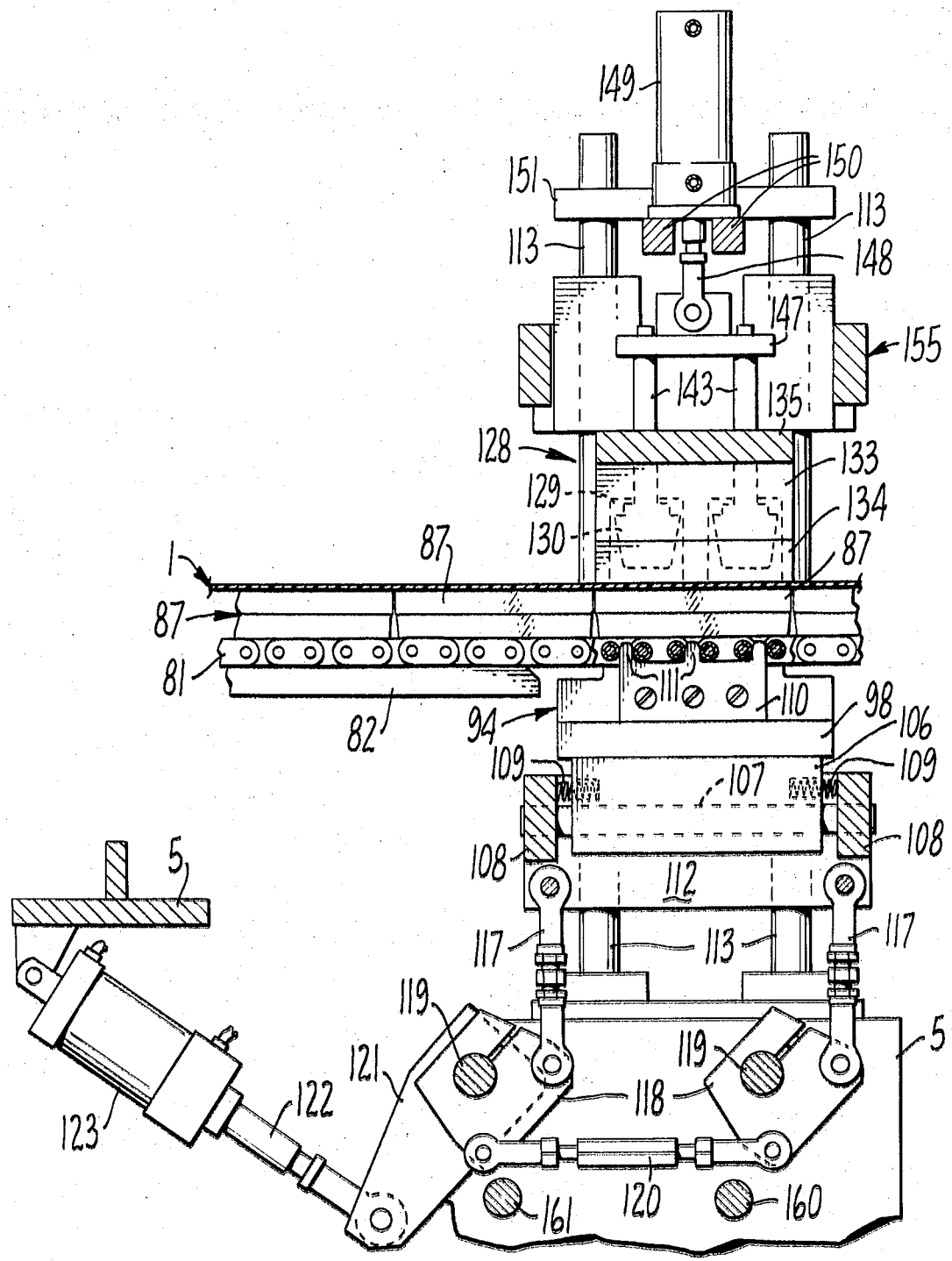
FIG. 20 is a fragmentary cross-sectional view along line 20—20 of FIG. 16.
Figure 21:
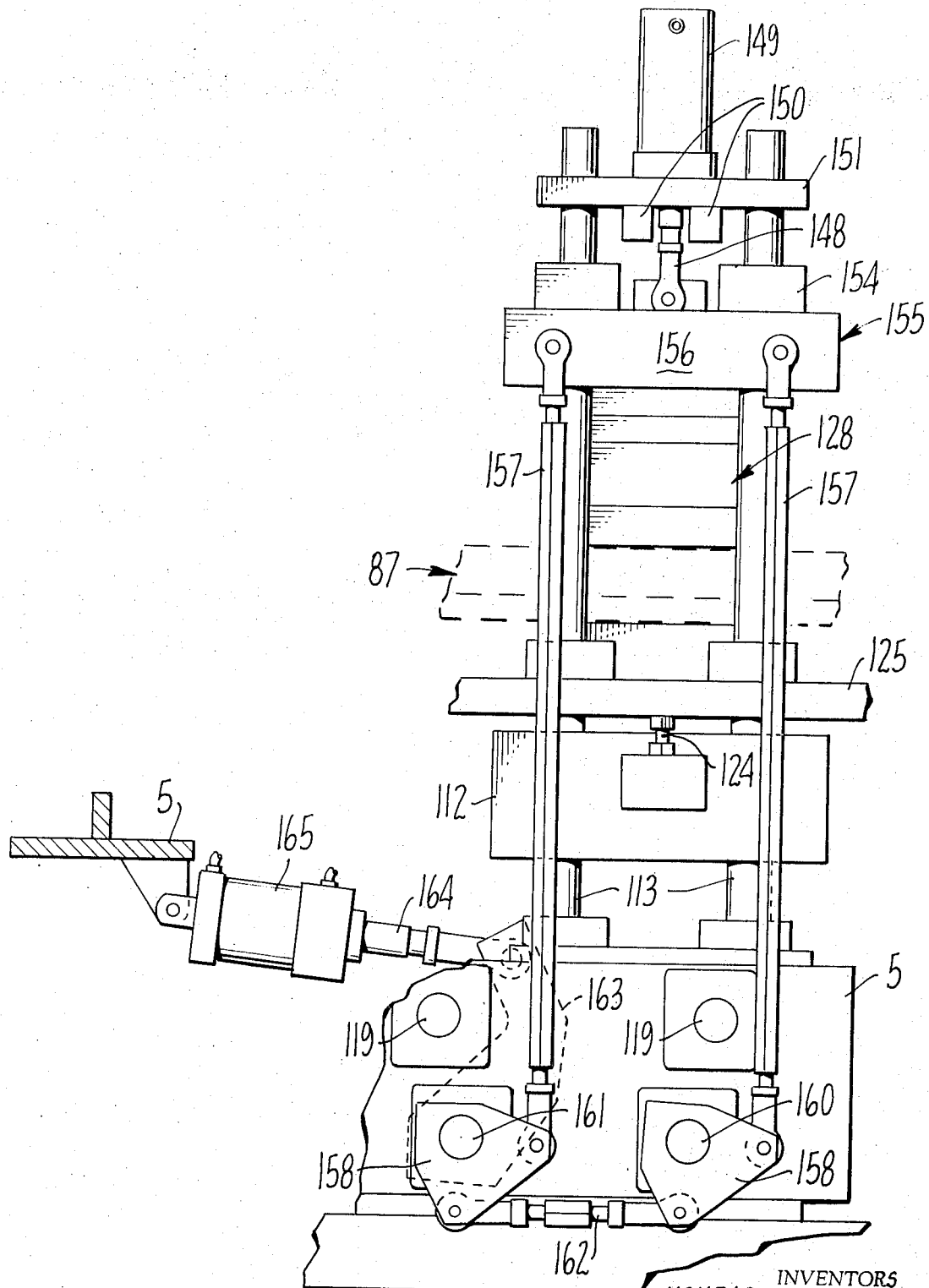
FIG. 21 is an elevational view of the portion shown in FIG. 16 as seen from line 21—21 of FIG. 16.

The uppermost ends of the rods 143 are secured to a horizontal plate 147 that, in turn, is pivotally connected, centrally thereof, to the depending end of a vertically reciprocable plunger 148 from an overhead air cylinder 149 (FIGS. 16, 20) that is stationarily supported on parallel horizontal bars 150. The ends of bars 150 are rigid with cross bars 151 that, in turn, are stationarily secured to the upper ends of the cylindrical guide posts 113 (FIGS. 16, 20, 21). Also each guide rod 113 is secured to the stationary element 125.

Bearings 154 are connected with, and may be considered part of, a horizontally disposed frame generally designated 155 that, in turn, is connected with the member 128 which member includes the plate 135, central body 133 and lower portion 134 in which are the recesses having the plug-assists therein. The frame 155 with which the bearings 154 are secured is vertically reciprocable on guide posts 113. (FIGS. 16, 20, 21)

End frame members 156 at the ends of frame 155 are pivotally connected to the upper ends of vertically extending rods 157, the lower ends of which rods are respectively pivotally connected to the outer ends of arms on pairs of cranks 158 (FIGS. 16, 21), one pair being at each side of the cup-forming apparatus at the cup-forming station. Shafts 160, 161, each rotatably supported on stationary portions of frame 5, has a said pair of cranks secured on their opposite outer ends. The cranks 158 are connected by a connecting rod 162 for simultaneous corresponding movement for effecting vertical reciprocable movement of the rods 157, and consequently of the frame 155 and the member 128.

The crank 158 on shaft 161 has an arm 163 projecting therefrom, which arm is pivotally connected at its outer end with the outer end of a piston rod 164 (FIG. 21) extending from an hydraulic cylinder 165. Cylinder 165, in turn, is pivotally connected to a stationary part of frame 5.

By the above structure, actuation of hydraulic cylinder 165 will effect reciprocable vertical movement of the member 128 that includes the recesses 129.

The operation of the cup former will later be described more in detail in the operation of the apparatus. However at this point it is seen that means is provided for hydraulically moving the lower mold form 94 upwardly against the upper mold form 87 on which the cup film is supported, and for hydraulically moving the member 128 downwardly against the film 1, and for evacuating the recesses 88 below the flim 1 and at the same time moving the plug-assists downwardly against the film 1 and into the mold forms while injecting air under pressure into the recesses 129 whereby the softened film will form the two rows of cups 166 in the film 1 (FIG. 18).

If a cup of greater capacity is desired, it is only necessary to change the single lower mold form at the cup-forming station with a form such as shown in FIG. 19 and generally designated 167. Any form of larger intermediate sizes may be substituted.

Each intermittent movement of the cup film is such that the transversely extending upwardly opening cup portions 166 are equally spaced apart in the continuous film.

CUP-FILLING STATION

The cup-filling station is generally designated 174 (FIG. 1). This apparatus is conventional, being a piston-type filler generally designated 175 in which an intake conduit 176 (FIG. 25) from a source of filling material feeds the material through rotary valves 177, each of which is provided with ports communicating between the source of material and a cylinder having a piston reciprocable therein, for receiving a charge of material for each cup when the piston is retracted and the valves are in a loading position, and for discharging the material when the valves are rotated to a discharge position.

Figure 25:
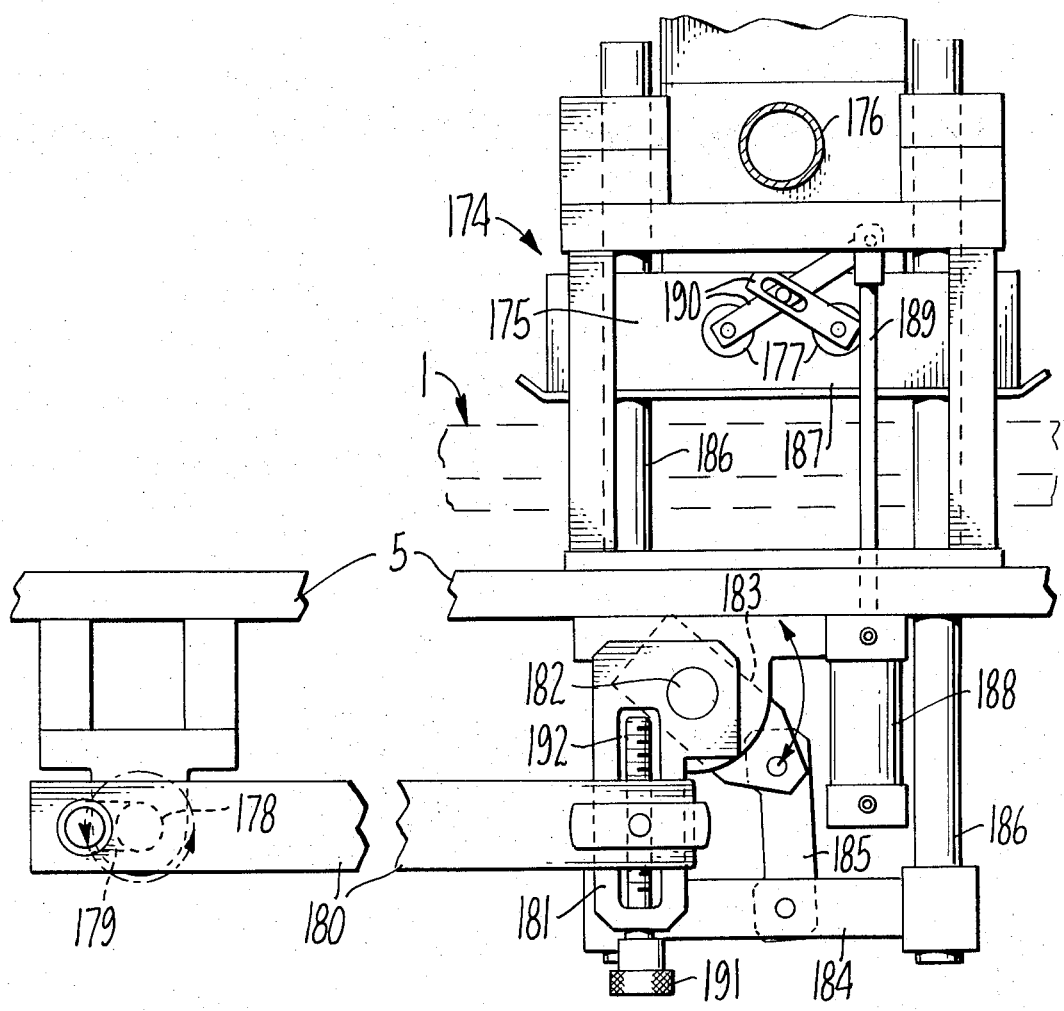
FIG. 25 is an enlarged, side-elevational view of the filler mechanism.

The main power drive shaft 178 (FIG. 23) is provided with a crank arm 179 (FIG. 25) connected with one end of a link 180, the opposite end of which is adjustably connected with one end of an arm 181 the opposite end of which arm 181 is connected with a shaft 182 (FIG. 25). Upon rotation of shaft 178 the shaft 182 will be oscillated. Said shaft has an arm 183 secured at one end thereto, and the opposite end is connected with a cross member 184 by a link 185. The cross member is connected at its ends to vertically reciprocable rods 186 that, in turn, are operably connected with pistons (not shown) in the charge receiving bores in the body generally designated 187 for reciprocating the latter to both receive material and to discharge it through valves 177 into the two rows of cups in film 1 at the filling station, the cup film 1 being indicated in broken lines in FIG. 25.

Air cylinder 188 is connected with the valves 177 by piston rod 189 and links 190 for actuating valves 177 to change their ports from loading to discharge positions and vice versa.

As already noted, the structure of the filler 175 is conventional and well understood in the trade, hence is not shown in detail.

The adjustable throw of arm 181 is effected by a manually rotatable screw 191 on arm 181 that extends through a nut guided longitudinally of the arm in a slot 192 (FIG. 25).

CUP-SEALING STATION

The cup-sealing station is generally designated 196, and is the station where a cover is sealed over the filled cups in the cup film (FIG. 1).

The cover sheet generally designated 197 (FIG. 27), is in the form of a strip of metal foil, one side of which is imprinted with separate printing or indicia for each of the cups in the cup film, and the other side is coated with a thermoplastic adapted to adhere to the cup film when heated and pressed thereagainst.

Said cover strip is drawn from a roll 198 (FIG. 1) between adjacent pairs of vertically spaced steel rollers 199 (FIG. 27) and then between an upper rubber roller 200 and a lower rubber roller 201. The upper roller 200 is on a shaft 200' rotatably supported in bearings spaced between the ends of horizontally extending arms 202. One arm is at each side of the machine and said arms are pivotally supported at one of the ends of said arms on a cross rod 204 that, in turn, extends between and is supported on a pair of horizontally extending rails 205 that are rigid with the main frame 5.

The opposite ends of said arms are connected with a vertical air cylinder 206, having a downwardly projecting piston rod 207 that is connected with a stationary element rigidly supported by rails 205.

The lower roller 201 is on a shaft 209 that is rotatably supported at its ends in stationary bearings on rails 205.

A constant supply of air under pressure below the piston in air cylinder 206 urges the upper roller 200 downwardly against the strip 197 to apply a predetermined constant pressure against said strip, and a conventional air actuated brake 213 (FIG. 27a) on one of the rails 205 is operative on shaft 209 at all times to apply a predetermined degree of resistance to movement of the strip 197 past rollers 200, 201. A solenoid valve 214 in the air line leading to brake 213 is in an electric circuit with electric eye 215, the latter being directed toward control marks on the printed side of the strip 197. These marks are related to the imprinting to be positioned over each filled cup, so that any abnormal variation in the spacing of the marks would result in actuation of the electric eye to energize the circuit to the valve 214 for increasing the brake pressure to roller 201.

In operation, the cover strip 197 is initially secured to the cup film 1 at the sealing station with the imprinted material in register with the cups, and the electric eye is then set to this register. The pressure of rollers 200 and 201 and the constant slight braking of roller 201 by the air brake 214 will result in the length of the strip between the rollers and the cup film being stretched or held taut under a uniform tension as the cup film and cover strip are moved through the machine past the sealing station. A variation in the spacing between the marks on the strip that are scanned by the electric eye will result in energizing the valve 214 to increase the tension on the strip 197 until the strip is stretched to the point where the register is again established, when the valve 214 will be actuated to again reduce the brake pressure to normal.

After passing the electric eye 215, the cover strip 197 is drawn around a lower roller 216 (FIG. 27) and extends horizontally forwardly from said roller to overlie cup film 1.

The lower cup forming molds 94 at the cup-forming station are lowered, as hereinbefore described, after the cups have been formed to enable movement of the upper mold forms and film 1 to the filling station and to the sealing station. Thus the lower end portions of the cups 166 project below the mold forms 87 at the sealing station (FIG. 27).

At the sealing station, the cup film 1 and the cover strip 197 are moved below a horizontal platen 217, which platen is heated by electric heating tubes 218. A sheet 219 of woven TEFLON (FIG. 27) secured to side strips 220 on platen 217 extends over the lower surface of the platen 217, and a layer of silicone rubber is between the sheet 219 and said platen. Thus the steel lower surface of the platen does not engage the cover strip 197 when the platen is lowered, and the resiliency of the silicone rubber, and sheet 219 insure application of uniform pressure against the portions of the strip 197 and the cup film 1 that are supported on the planar upper surfaces of each mold form 87 around the openings 88 in said forms when pressure is applied by the heating platen.

Figure 27:
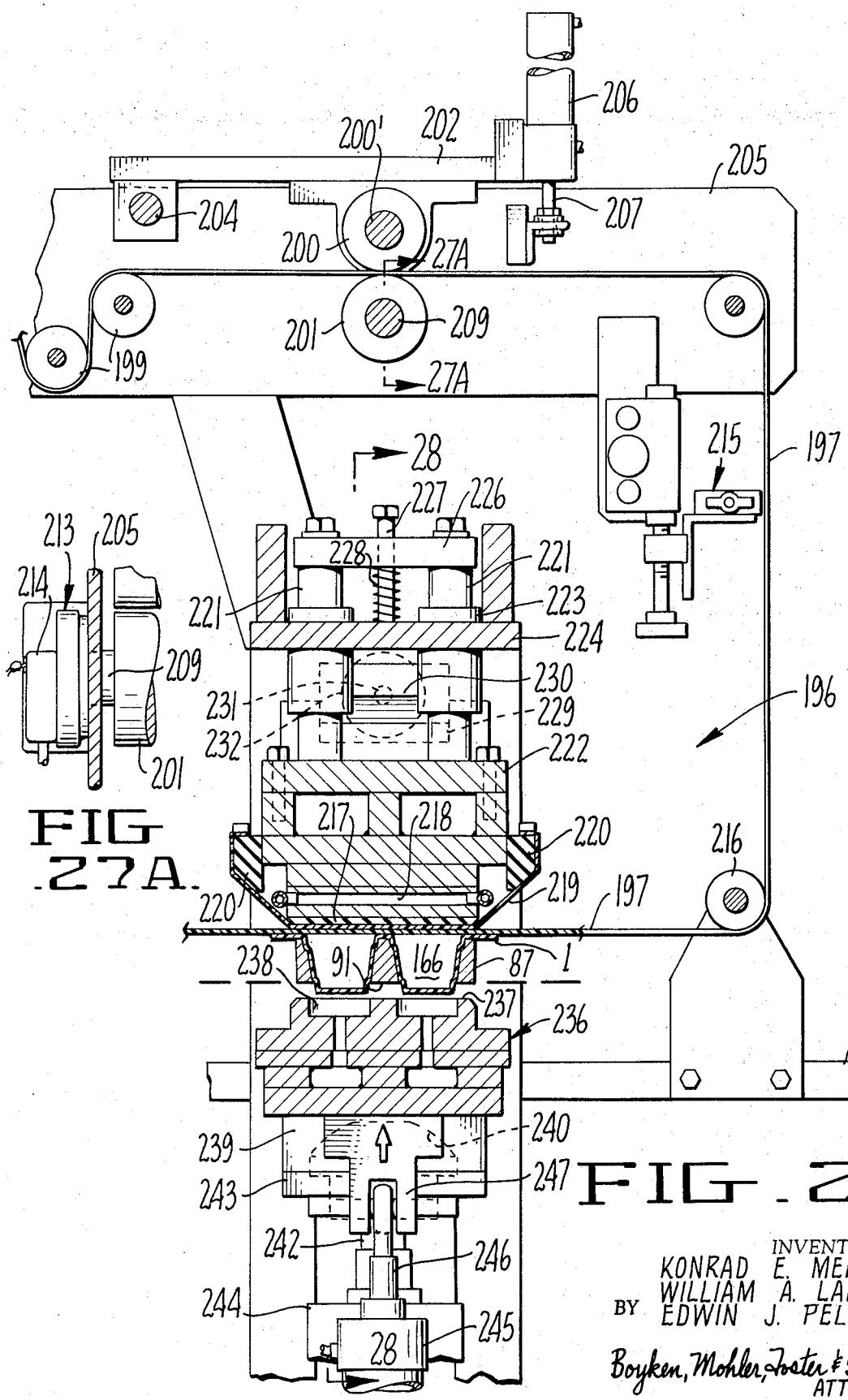
FIG. 27 is an enlarged cross-sectional view through the sealing mechanism at the sealing station.

Sets of vertical guide posts or rods 221 are secured at their lower ends to superstructure above the platen 217 that is rigid therewith, and that includes a horizontal plate 222 (FIG. 27). Said posts extend upwardly from plate 222 through guide bearings 223 for vertical reciprocable movement of the platen relative to the bearings. Said bearings 223 are rigid on a horizontal element 224 that, in turn, is rigid on the main frame 5, and element 224 is spaced above plate 222.

The upper ends of posts 221 are secured to a horizontal plate 226. Said plate 226 is spaced above element 224, and upstanding rods 227 secured at their lower ends on element 224 slidably extend through plate 226.

Coil springs 228 around rods 227 react between element 224 and plate 226 for yieldably urging said plate 226 and heating platen 217 to an upper position. In this upper position the heating platen assembly will be spaced above the cup film 1 and its cover strip 197.

A wedge engaging block 229 (FIG. 28) is centrally positioned on plate 222 of the heating platen assembly. Said block has an upper wedge engaging surface inclined relative to horizontal, and the element 224 spaced thereabove has a lower horizontal wedge engaging surface.

A horizontally elongated wedge 230 extending longitudinally of the machine is positioned between said upper and lower wedge engaging surfaces and has upper and lower surfaces in engagement therewith.

One end of wedge 230 is connected with the plunger rod 231 projecting from an air cylinder 232, which, when actuated will move the wedge 230 in one direction or the other to effect movement of the platen assembly to its upper position under the influence of springs 228 or to move the platen to its lower position as seen in FIG. 27, 28. The wedge is retracted when the platen assembly is in its upper position and in said upper position the heating platen assembly is spaced above the cup film 1 and the cover strip 197. The TEFLON and the silicone rubber that extend across the lower surface of the heating platen are considered part of the platen. Said wedge is retracted only during threading of the film therepast.

A horizontally extending block generally designated 236 is below the heating platen at the sealing station. This block has a horizontal, planar upper surface 237 (FIG. 27), the outside outline of which substantially conforms to the outside outline of the lower portion of each upper mold form 87. Recesses 238 are formed in the upper surface of block 236, which recesses are adapted to freely receive the depending lower ends of cups 116 in an upper mold form to be positioned thereover at the sealing station, and the planar upper surface 237 around said recesses will engage the lower surfaces 91 on said upper mold form when the block 236 is moved upwardly.

Block 236 is provided on its underside with a central, downwardly projecting portion 239 formed with a downwardly opening recess 240 having a spherical surface.

A plunger head 241 (FIG. 28) on a vertical plunger rod 242 has a spherical upper surface that is seated against the spherical surface of the recess 240, and said head is held with the portion 239 by a ring 243 bolted thereto. The plunger rod 242 extends upwardly from hydraulic cylinder 244. The fit of the head 241 is such as to permit a rocking movement of the body 236 on said head.

Below the ends of block 236, and spaced at two opposite sides of the hydraulic cylinder 244 are vertical air cylinders 245, their plunger rods 246 projecting from their upper ends and the upper ends of said rods are pivotally connected with depending clevises 247 secured to block 236. The cylinders 244, 245 and their plunger rods are in alignment transversely of the direction of movement of the film 1.

Figure 28:
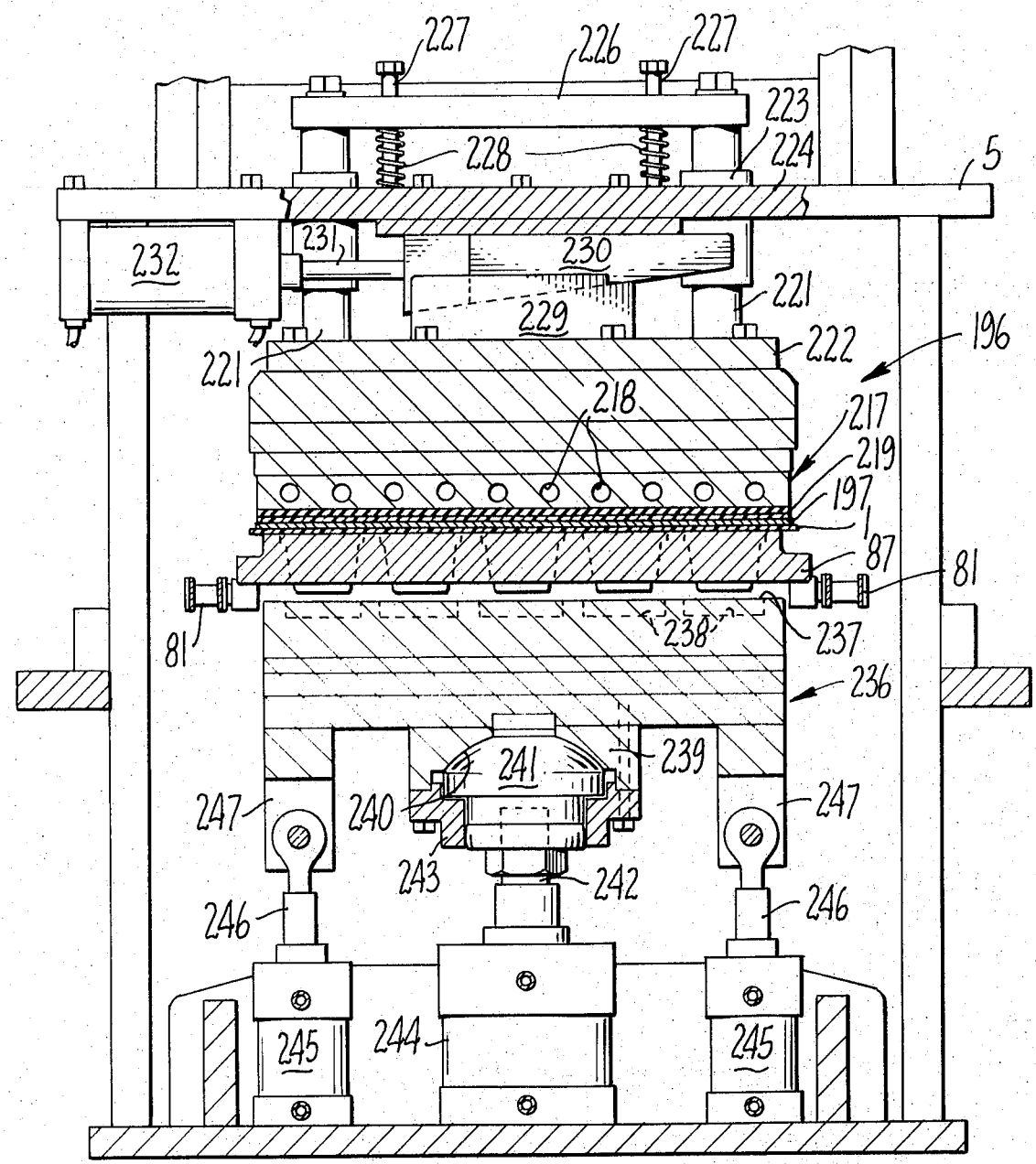
FIG. 28 is a cross-sectional view along line 28—28 of FIG. 27.

The block 236 is shown in its lower position in FIG. 28 and in FIG. 27.

Actuation of the air cylinder 232, hydraulic cylinder 244 and air cylinders 245 for moving the heating platen downwardly against the strip 197 and film 1, and for moving the block 236 upwardly against the upper form mold 87 will result in applying compressive pressure on the portions of the cup film 1 around the cup openings and the cover strip 197 for effecting a positive sealing of the cover strip to said portions.

The permitted movement of the block 236 about axes at a right angle to each other including the force applied by the actuation of the air cylinders 245 and hydraulic cylinder 244, coupled with such resiliency as the silicone rubber layer on the heating platen insures a consistently tight sealing of the filled packages, which is very important. The application of such pressure directly to the planar portions of the cup film around the cups, also contributes to the consistency of the effective sealing, and this pressure is transmitted independently of any strain on the chains 81 carrying the mold forms.

DIE CUTTING STATION

The die cutting station itself is generally designated 251.

After the cover strip 197 is sealed to the planar portion of the cup film 1 that is around the cup cavities, said film passes below a fixed idler roller 252 in a forward direction (FIGS. 1, 29).

At a point spaced forwardly from roller 252 the film 1 passes over a coaxial row of circular discs 253 (FIG. 29) which discs are positioned between adjacent pairs of cups 166 in the adjacent rows thereof that extend longitudinally of the film, and outwardly of the opposite ends of said rows, so that their circular outer peripheries engage the lower surface of portions of the film to which the cover sheet is sealed. The depending cups pass between said discs.

Said discs are secured on a shaft 254, which shaft is rotatably supported at its ends on a stationary portion of the machine in a position in which the upper outer peripheries of the discs are substantially higher than the level of the cup forms 87 in which the cups 166 are positioned (FIG. 29).

A row of stripper ribs and film supports 255 extend from a point adjacent to and forwardly of roller 252 to the discs 253 and are supported in spaced relation to each other the same as discs 253. The upper edges of said ribs 255 are inclined upwardly from roller 252 in a forward direction and engage the same portions of the film 1 that will be engaged by said discs. Thus said ribs will carry the cup film to the upper peripheries of discs 253, as well as receiving the cups 166 from the mold forms 87, commencing at roller 252, during forward movement of the cup film.

An upper row of coaxial equally spaced rollers 256 is positioned over the row of discs 253 (FIGS. 29), one of said rollers being positioned directly over each disc, and which rollers are axially wider than the discs. Said rollers may be in two sets each carrying three rollers with coaxial shafts 257 for each set, and which shafts are each supported at its ends on the forward ends of a pair of arms 258. The rear ends of said arms are secured on a shaft 259 that is rotatably supported at its ends on stationary brackets 260 at the sides of the machine.

A transverse overhead bar 261 secured at its ends on brackets 260 and spaced above the sets of arms 258 extends across said arms, and springs 262 react between said bars and each of the arms 258 to yieldably urge the rollers 256 downwardly against the coplanar portions of the cup film for yieldably forcing said portions against discs 253.

The rear end portions 263 of arms 258 project rearwardly from shaft 259 and a rod 264 extends across the upper sides of said portions 263. Said rod 264 has eccentrics 265 at its ends rotatably supported in bearings on said brackets 260. A manually graspable handle 266 on one, or on each eccentric, is adapted to rotate the eccentrics depressing the rear end portions 263 of arms 257, thereby lifting the rollers 256 off the cup strip to enable threading the latter between discs 253 and rollers 256.

Relatively short tibs 255' are in extension of ribs 255 and are positioned between the discs and the die cutter (FIGS. 29, 30).

The cutting machine at the die cutting station is conventional, including a vertical, stationary hydraulic cylinder 269 (FIG. 29) and a plunger extending upwardly therefrom having a punch 270 thereon reciprocable to and from a stationary die 271. Each pair of rows of cups 166 formed at the cup-forming station, after filling and sealing, is moved below and against the stationary die and when in such position, the hydraulic cylinder is actuated to move the punch upwardly to punch out the individual cups 280 with their cover sheets sealed thereto. After being cut out the succeeding forward movement of the cup film will move the individual cups 280 to the upper ends of separate downwardly inclined chutes 272.

The scrap film is moved upwardly away from the punch in a forward direction to a position between a pair of rollers 273, 274. The scrap 275 is gripped between said rollers, the lower roller 274 being power driven to drive the scrap to the scrap cutter where it is cut into pieces for salvage.

The scrap cutter 276 (FIG. 29) includes a vertical air cylinder 277 having a downwardly projecting plunger 278 carrying the cutter 279. Upon actuation of the air cylinder the cutter descends to cut the scrap film.

THE DRIVE

The cup film 1 and cover strip 197 are initially positioned together at the sealing station, where the cover strip is carefully positioned with the imprinted matter thereon in accurate register with the upper open ends of the filled cups 166 at said station. When sealed together at the sealing station, it is seen that the cover strip and cup film will move together in a forward direction, upon actuation of the forward shaft 86 over which the forward sprockets 84 for the mold chains 81 extend. The cups 166 are retained in the molds up to the time the cup film reaches the roller 252 (FIG. 29).

Figure 23:
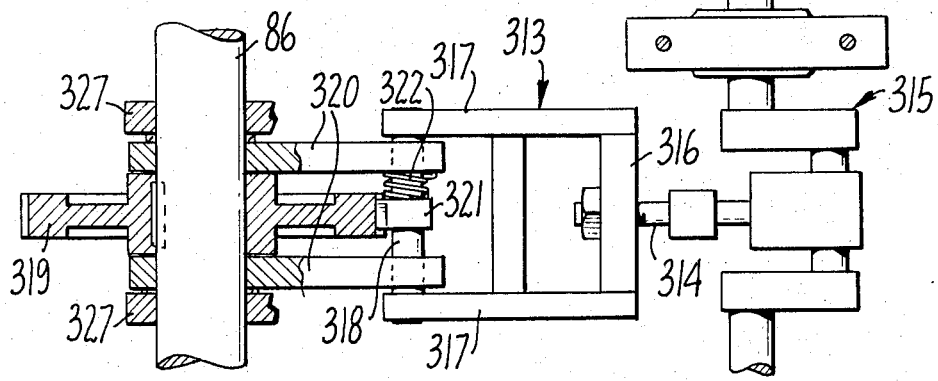
FIG. 23 is a view along line 23—23 of FIG. 22.
Figure 26:
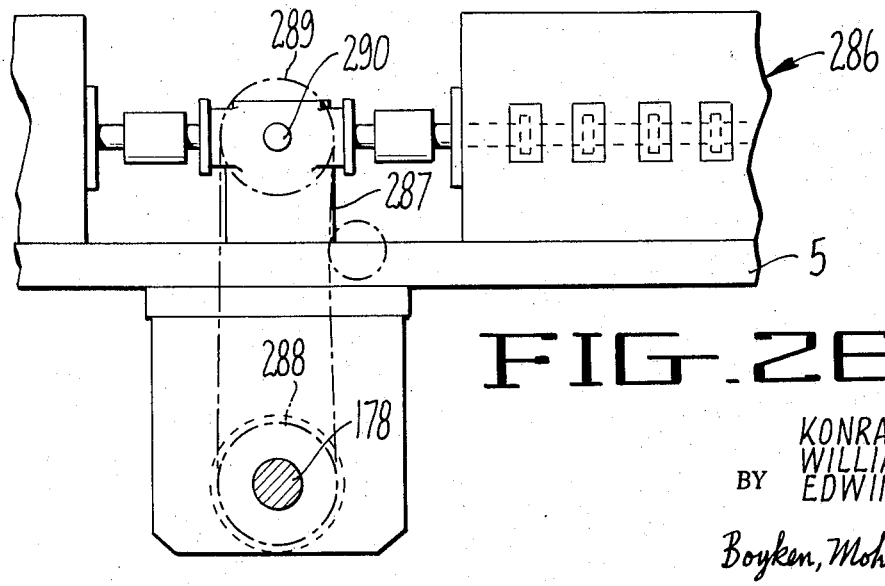
FIG. 26 is a fragmentary, simplified view of a conventional programmer drive for controlling actuation of the hydraulic and air cylinders associated with different assemblies.

The main drive shaft 178 (FIGS. 23, 25, 26, 31) is continuously driven by hydraulic motor 285 (FIGS. 23, 31). A conventional programmer 286 (FIG. 26) in an electrical circuit with the solenoid actuated valves in the air and hydraulic circuits for the air and hydraulic cylinders, as heretofore described, is connected with shaft 178 by a chain 287 extending over sprockets 288, 289 respectively on shafts 178 and 290, the latter being operatively connected with a pair of programmer units containing the switches in an electrical circuit for actuating the solenoid valves (FIGS. 26, 31).

Referring to FIGS. 29, 31, the forward shaft 86 carrying the forward sprockets 84 for the mold carrying chains 81, has a sprocket 293 thereon. An endless chain 294 connects sprocket 293 with a sprocket 295 (FIG. 31) on a shaft 296, the latter being supported for rotation on a stationary part of the main frame.

A second sprocket 297 (FIG. 31) on shaft 296 is connected by an endless chain 298 with a sprocket 299 on shaft 254 to drive the latter. Shaft 254 carries the row of discs 253 adjacent the die cutting station 251.

A third sprocket 300 (FIG. 31) on shaft 296 is connected by an endless chain 301 with a first sprocket 302 on shaft 303. Said shaft 303 has a second sprocket 304 thereon that is connected by a chain 305 with sprocket 306 on shaft 274' (FIG. 29), which shaft has roller 274 thereon. Roller 274 is adjacent the scrap cutter and drives the scrap to the scrap cutter as well as holding the length of scrap taut between the die cutter and the scrap cutter.

The cups 280 when punched from the length of cup film pass between parallel downwardly inclined pairs of chutes 272 that deliver the filled cups to a conveyor or other receiver.

FIG. 3 shows a completed filled and sealed cup 280, and it may be noted that the flange around the upper edge of the cup is slightly depressed at 281 below the remainder of the flange to prevent the cover from being adhered to the flange at that point, thereby providing a free portion of the foil cover for gripping between the fingers to remove the foil. This depressed portion does not extend to the opening, hence the contents are hermetically sealed in the cup.

Chains 307 (FIGS. 7, 31) extend over sprockets 308, 309 respectively on shafts 24, 47, the former being the lower forward shafts for sprockets 23, and the latter being the forward upper shafts for sprockets 45. Sprockets 23 are for chains 14 and sprockets 45 are for chains 42.

From sprockets 308, 309 the chains 307 extend forwardly over sprockets 310 on shaft 311 that is supported at its ends for rotation on supports that are rigid with the main frame.

Sprockets 312 on shaft 311 have their teeth in mesh with the links on chains 81. Hence it is seen that the chains 14, 42 are positively connected through chains 307 with the chains 81, and said chains 14, 42 of the initial film carrying portion of the apparatus will be intermittently driven simultaneously with intermittent movement of the mold forms to move the cup film to the mold forms.

From the foregoing description, it is seen that the driving source for driving the cup film 1 and the cover strip 197 through the machine from rolls 2 and 198 respectively, is the hydraulic motor 285 (FIGS. 1, 23). This motor is continuously actuated during the operations of forming, filling, sealing, die cutting, and scrap cutting. However, the movement of the cup film and cover strip is intermittent.

To effect this intermittent movement, a connecting rod assembly 313 (FIGS. 22, 23) includes a rod 314 that is connected at one end with crank 315 on shaft 178. The opposite end of rod 314 is secured to a cross rod 316 at a point intermediate the ends of the latter, and one of the ends of a pair of parallel bars 317 are secured to the ends of the cross rod 316 while a shaft 318 parallel with rod 316 extends between and is secured to the opposite ends of bars 317.

A ratchet wheel 319 is secured on shaft 86, and one of the ends of a pair of arms 320 are rotatably supported on shaft 86 at opposite sides of said ratchet wheel. The other ends of arms 320 are rotatably supported on the shaft 318. A pawl 321 rotatable at one of its ends on the shafts 318 is between the arms 320 and a torsion spring 322 in engagement with said pawl yieldably urges the outer end of the pawl against the ratchet wheel for driving engagement with said ratchet causing reciprocatory movement of arm 317 under the influence of crank 313, and consequent oscillatory movement of pawl 321.

Thus it is seen that the forward sprocket wheel 84 will be intermittently moved in a direction for moving the mold forms on the upper rims of chains in a forward direction.

Figure 24:
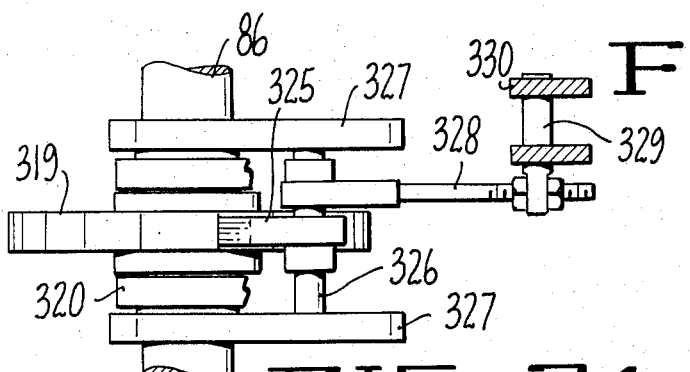
FIG. 24 is a view along line 24—24 of FIG. 22.

A second pawl 325 (FIG. 22) is pivotally supported intermediate its ends on a pivot 326 that extends between and that is carried by a pair of arms 327, the inner ends of which arms are rotatably supported on shaft 86. Pawl 325 is at the top of ratchet wheel 319 and a connecting rod 328 pivotally connected at its forward end with pivot 326 extends rearwardly therefrom and its rear end is secured on a pin 329 (FIG. 24) that, in turn, is carried on a bracket 330 rigid with the main frame. Pawl 325 holds the ratchet wheel, and consequently the mold carrying chains against rearward movement of the upper runs of the latter between each intermittent forward movement.

Inasmuch as the cups 166 are in the upper mold forms on the upper runs of the chains 81, and the cover strip 197 is secured to the cup film after the latter reaches the sealing station, it is seen that once the leading end of film 1 is past the mold forming station, intermittent movement of the forward sprocket wheels 84 will automatically move the film to and past the filling station and sealing station. After the leading end of the cover strip 197 is secured to the film strip at the sealing station, its movement with the film strip will be effected by actuation of pawl 321 that, in turn, is oscillated by rotation of the main shaft.

The actuation of air cylinders 69 (chain tightener), 206 (pressure on cover strip), 245 (lower block at sealing station) is continuous, hence these cylinders are not in an air circuit controlled by the programmer 286. The air actuated brake 213 on roller 201 that is opposite to roller 206 is in an air line controlled by the electric eye 215, hence it is not controlled by the programmer.

The other air cylinders 149 (plug-assists at cup-forming station), 188 (for valves at filling station) are in air lines controlled by solenoid valves in an electric circuit controlled by the programmer 286. Also solenoid actuated valves in vacuum line 101 (to lower mold form at cup-forming station) and air pressure line 139 (to upper member above cup film at the cup-forming station) have solenoid actuated valves in an electrical circuit controlled by the programmer.

The hydraulic cylinders 123, 165 (at cup-forming station), air cylinder 232, and hydraulic cylinder 244 (at sealing station), 269 at die cutting station, and air cylinder 277 at the scrap cutting station are controlled by solenoid actuated valves in an electrical circuit controlled by the programmer.

As already mentioned the programmer is continuously driven by the hydraulic motor 285 which motor continuously drives shaft 178, which, in turn, intermittently rotates shaft 86 through the pawl-sprocket connection with shaft 86. Sprockets 84 on shaft 86 intermittently advance the cup film and cover film, and the programmer 286 automatically effects actuation of the valves in the air and hydraulic lines to open and close the lines during the intervals for forming, filling, sealing, die cutting, and scrap cutting of the cup film, as hereinbefore described. There is nothing new in the programmer itself, the one illustrated being a standard 12 switch, rotary cam type that makes and breaks the circuits to the solenoid valves in the air and hydraulic lines.

I claim:

1. In a machine for packaging individual portions in cups to be formed in plastic sheet material, the combination of:
    a. a source of continuous, planar, thermoplastic cup film in a strip;
    b. means for moving said strip longitudinally thereof in one direction from said source along a horizontally extending path of travel;
    c. a cup-forming station along said path spaced from said source;
    d. means for heating said strip between said source and said cup-forming station by radiant heat above said strip for softening said cup film;
    e. film-gripping means for gripping the longitudinally extending marginal portions of said strip during heating of said film, said film-gripping means being supported for movement with said film in said one direction progressively increasing distances apart for progressively stretching said film as it is softened to resist sagging of the softened film, and means for moving said film-gripping means;
    f. means for yieldably urging said film-gripping means in yieldable gripping engagement with said marginal portions during said stretching of said film;
    g. means at said cup-forming station for forming spaced upwardly opening cups therein integrally connected by horizontal planar webs of said cup film between the open upper ends of said cups;
    h. a filling station and a sealing station supported along said path at points spaced from each other longitudinally of said path;
    i. means for supporting a cover strip having a heat fusible adhesive on one side for movement of said cover strip onto said cup film during movement of said cup film to said sealing station, with said adhesive against the upper surfaces of said planar webs;
    j. an upper pressure plate rigidly supported above said cover strip at said sealing station having a horizontal, planar, lower surface engageable with the upper surfaces of said webs, and means for heating said upper pressure plate;
    k. said means at said cup-forming station for forming said cups including a mold form having web-engaging planar surfaces in engagement with the lower surfaces of said webs and movable with said cup film to said sealing station, said mold form supporting said webs at said sealing station substantially in engagement with said webs;
    l. a lower pressure plate below said mold form at said sealing station supported for upward movement against said mold form for applying pressure to said webs, and said cover strip for fusing said adhesive onto said web by said pressure and heat from said upper mold form, and means supporting said lower pressure plate for universal movement upon said application of pressure against said webs to insure uniformity in the seal between said cover strip and said webs; and
    m. power means connected with said lower pressure plate for applying said pressure to said webs and cover strip.

2. In a machine for packaging individual portions in cups formed in a strip of thermoplastic cup film, which machine includes a cup-forming station to and past which said strip is moved in one direction longitudinally of the latter:
    a. cup film heating means for applying heat to said film along a length of the latter during movement of said strip to said cup-forming station for progressively softening said film;
    b. cup film gripping and stretching means for gripping the longitudinally extending marginal portions of said strip during said application of heat thereto movable along divergent paths generally in said one direction with said strip when in gripping relation with said marginal portions for progressively stretching said cup film during said movement of said strip and the progressive heating of the latter to reduce sag of the portion of the film between said marginal portions;
    c. cup film moving means for so moving said strip;
    d. said cup film gripping and stretching means supporting said cup film suspended generally horizontally between said marginal portions during said heating of said cup film; and
    e. said direction of movement of said cup film in said one direction being generally horizontal;
    f. a mold form at said cup-forming station having an upwardly opening cavity, and means including said cup film gripping and stretching means for supporting and guiding the softened cup film over said mold form and cavity in a position for drawing of the softened portion of said cup film over said cavity into the latter to form a cup in said cup film; and
    g. means for so drawing said softened portion into said cavity while said marginal portions of said cup film are held by said gripping and stretching means against movement toward said cavity;
    h. said mold form having an upper part and a lower part for respectively forming the upper sides of a cup, and the bottom and part of the lower sides of said cup;
    i. said upper part of said mold form being one of a succession of upper parts moved in succession to said cup-forming station; and
    j. said lower part being a single part movable toward and away from an upper part, and against movement in said one direction, when one of the upper parts of said succession is thereabove;

k. said cup film moving means being intermittently activated for moving said cup film intermittently in said one direction with said cup film stationary between said movement thereof;

l. said cup film moving means including power means operatively connected with said succession of upper parts of said mold form;

m. means connected with said lower part of said lower mold form for moving it downwardly a sufficient distance to enable the lower portion of the cup formed in said lower part of said mold form to move in said one direction upon movement of said cup film and upper part of said mold form in said one direction after a cup has been formed in said mold form;

n. means for releasing said cup film gripping and stretching means from said marginal portions during movement of said cup film in said one direction beyond said cup-forming station;

o. a filling station and a cup-sealing station successively spaced in that order from said cup-forming station beyond the latter in said one direction below which filling station and sealing station said succession of said upper parts of said mold forms extend, whereby each cup formed at said cup-forming station will be carried to and past said filling and sealing station during movement of said cup film for filling and sealing each cup at said filling and sealing stations.

3. A machine for packaging individual portions in cups formed in a strip of thermoplastic cup-film comprising:

a. horizontally extending gripping and stretching means for gripping a strip of thermoplastic cup-film along each of its longitudinally extending marginal portions and means for supporting said cup-film for movement longitudinally of said strip in one direction to a cup-forming station, said gripping and stretching means extending divergently in said one direction for progressively stretching said film transversely of its length during said movement, and radiant heating means spaced above the portion of said strip between said marginal portions and said gripping and stretching means for softening said film;

b. cup-forming means at a cup-forming station adjacent the divergent ends of said gripping and stretching means, including a horizontally extending row of mold forms extending longitudinally of said strip away from said gripping and stretching means in said one direction, each mold form having an upwardly opening cavity spaced from the cavity in the mold form adjacent thereto and means including said cup-film gripping and stretching means for supporting and guiding the softened, and stretched, cup-film over said row onto said mold forms in a position extending over said cavities;

c. said cup-forming means further including means for drawing spaced portions of said softened cup-film into the cavities nearest said gripping and stretching means while said marginal portions of said strip of cup-film are held by said gripping and stretching means against movement toward said last mentioned cavities for forming upwardly opening cups in said cup-film with coplanar horizontal webs between and connecting said cups;

d. cup-filling means over said row of mold forms adjacent but beyond said cup-forming means for actuating said filling means for filling said cups while said cups are supported by said mold forms;

e. sealing means positioned over said row of mold forms spaced from said filling means in said one direction including cover-supporting means for supporting a cover strip for movement longitudinally of said cup-film over the filled cups supported by said mold forms and onto the webs between said filled cups, and means for applying heat and pressure against said cover strip and webs at the latter for heat sealing said cover strip to said webs;

f. cup-removing means for removing said filled and sealed cups from said mold forms during movement of said cup-film in said one direction after said cover strip has been sealed thereto;

g. separating means for separating the filled and sealed cups from each other during said movement of said strip in said one direction and after their removal from said mold forms whereby the separate individual packaged portions are formed; and h. means connecting said row of mold forms with said gripping and stretching means for moving said cup-film intermittently, and at the same speed during said movement and for holding said cup-film stationary during the formation of said cups and during the filling, sealing, and separating of the latter.

4. In a machine as defined in claim 3:

i. said cup-film gripping and stretching means comprising the lower generally horizontally extending parallel runs of a pair of endless sprocket chains positioned one over the other along each of the longitudinally extending marginal portions of the strip of cup-film to be gripped, with said runs extending substantially to said cup-forming station at one of their ends;

j. film supporting means carried by the lower run of one of the chains of each pair supported for movement toward each other to positions beneath said marginal portions during movement of said cup-film to said station and for movement away from each other and from said cup-film during movement of said cup in said one direction past said cup-forming station;

k. the lower runs of the other chains of said pair being above said film supporting means carried by said lower runs of said one of said chains of said pair, and means for yieldably urging said lower runs of said other chains downwardly against the marginal portions of said cup-film when supported on said film supporting means for gripping said marginal portions during said movement of said cup-film to said cup-forming station.

5. The method of packaging individual portions comprising the steps of:

a. intermittently moving a continuous strip of cup-film of thermoplastic material along a path in one generally horizontally extending direction longitudinally of said strip successively past a cup-forming station, a filling station, and a sealing station;

b. progressively softening said cup-film by radiant heat from above during said movement to said cup-forming station and at the same time gripping the longitudinal marginal portions of said cup film and progressively stretching the latter transversely of its length as the cup-film becomes progressively softer to prevent substantial sagging of the portion of said cup-film between said marginal portions during application of said heat, and suspending said portion during heating and softening from said marginal portions;

c. forming in said cup-film the side walls and bottom walls of upwardly opening cups connected at their upper ends by coplanar horizontal webs by drawing spaced portions of said softened film downwardly to and against upper and lower bounding surfaces of enclosed spaces below said portions during one of the intervals between said intermittent movement of said cup-film, the lower of which bounding surfaces defines the exterior bounds of said bottom walls and of the lower parts of said side walls; then d. removing said lower bounding surfaces to expose said bottom wall and said lower parts of said side walls for movement of said strips, including said cups to said filling station free from said lower bounding surfaces with said side walls above said lower bounding surfaces supported against said upper bounding surfaces; then e. filling said cups at said filling station during an interval between said intermittent movement, while said side walls are supported against said upper bounding surfaces, and thereafter moving said filled cups to said sealing station, and at the same time moving a cover strip of thermoplastic film over said cup-film and filled cups and against said webs; and then f. heat sealing said cover strip to said webs at said sealing station during an interval between said movement of said cup-film, by application of heat and pressure to said webs and cover strip and supporting said side walls of said cups by said upper bounding surfaces against downward extension and lateral outward distortion under the influence of the material within said cups and the heat and pressure applied to said webs and cover strip, then releasing said webs; and g. moving said cup-film including said filled cups upwardly out of said upper bounding surfaces and thereafter separating said filled and covered cups from each other along lines along said webs spaced around the upper ends of said cups.

6. In the method as defined in claim 5:

h. assisting the downward drawing of said cup-film to form said cups at said cup-forming station by applying air under pressure to the upper side of said cup-film within the upwardly projected outlines of said lateral surfaces, and at the same time applying a downward mechanical force against said upper side spaced substantially within said outline and from said lateral and bottom sides of the cups formed at said cup-forming station.

7. In the method as defined in claim 5:

h. moving said bounding surfaces back to space bounding positions for the subsequent cups to be formed at said cup-forming station.

* * * * *